(12) United States Patent
Takezawa et al.

(10) Patent No.: US 7,730,363 B2
(45) Date of Patent: Jun. 1, 2010

(54) RELIABILITY EVALUATION SYSTEM, RELIABILITY EVALUATING METHOD, AND RELIABILITY EVALUATION PROGRAM FOR INFORMATION SYSTEM

(75) Inventors: Nobuhisa Takezawa, Tokyo (JP); Katsuhiko Nakahara, Tokyo (JP); Yuuji Uenohara, Tokyo (JP); Masayuki Takayama, Tokyo (JP); Hiroaki Okuda, Tokyo (JP)

(73) Assignee: Toshiba Solutions Corporation, Tokyo (JP)

( * ) Notice: Subject to any disclaimer, the term of this patent is extended or adjusted under 35 U.S.C. 154(b) by 440 days.

(21) Appl. No.: 11/576,395

(22) PCT Filed: Sep. 30, 2005

(86) PCT No.: PCT/JP2005/018123

§ 371 (c)(1),
(2), (4) Date: Jul. 13, 2007

(87) PCT Pub. No.: WO2006/035931

PCT Pub. Date: Apr. 6, 2006

(65) Prior Publication Data

US 2008/0059840 A1 Mar. 6, 2008

(30) Foreign Application Priority Data

Sep. 30, 2004 (JP) ............................... 2004-289238

(51) Int. Cl.
*G06F 11/00* (2006.01)
(52) U.S. Cl. .............................. 714/47; 714/21; 714/26; 714/33; 714/37
(58) Field of Classification Search ...................... 714/4, 714/21, 26, 30, 33, 37, 39, 40, 43, 47; 705/400
See application file for complete search history.

(56) References Cited

U.S. PATENT DOCUMENTS 7,133,727 B2 * 11/2006 Van Dyk et al. ............... 714/4

(Continued)

FOREIGN PATENT DOCUMENTS

JP 9 234652 9/1997

(Continued)

OTHER PUBLICATIONS

Kenji Kitagawa, "Saishin Sekkei Shinsa Gijutsu (Latest Design-Review Technique)", Technosystem, Inc., Second Edition, 1987, (with partial english translation).

*Primary Examiner*—Robert Beausoliel
*Assistant Examiner*—Joseph D Manoskey
(74) *Attorney, Agent, or Firm*—Oblon, Spivak, McClelland, Maier & Neustadt, L.L.P.

(57) ABSTRACT

A system includes an input unit (2) to which failure information corresponding to failure modes of constituents indicating software and hardware, a system configuration information and a standard value of system availability are inputted, a producing unit (32) producing a fault tree based on the system configuration information, a calculating unit (34) calculating unavailability corresponding to the failure modes based on a result of analyzing the failure information, and calculating system availability based on the calculated unavailability and the fault tree, a determining unit (35) determining whether the system availability meets the standard value, an extracting unit (36) extracting a basic event related to an increase in the system availability when the system availability is determined to be below the standard value, and resetting units (38, 39) resetting new unavailability and the like based on whether it is possible to reduce the unavailability of the extracted basic event.

17 Claims, 11 Drawing Sheets

U.S. PATENT DOCUMENTS

| | | |
|---|---|---|
| 7,139,676 B2 * | 11/2006 | Barford .................. 714/26 |
| 7,158,958 B2 * | 1/2007 | Przytula et al. ............ 714/37 |
| 7,379,846 B1 * | 5/2008 | Williams et al. ........... 714/26 |
| 2003/0028823 A1 * | 2/2003 | Kallela et al. ............. 714/26 |
| 2004/0078683 A1 * | 4/2004 | Buia et al. ................ 714/37 |
| 2006/0095247 A1 * | 5/2006 | O'Connell et al. ......... 703/22 |

FOREIGN PATENT DOCUMENTS

| | | |
|---|---|---|
| JP | 09 237102 | 9/1997 |
| JP | 2000 194561 | 7/2000 |
| JP | 2000 235507 | 8/2000 |
| JP | 2002 202371 | 7/2002 |
| JP | 2002 334293 | 11/2002 |
| JP | 2003 337918 | 11/2003 |

* cited by examiner

FIG. 4

| INSTRUMENT GROUP | INSTRUMENT | CONSTITUENT | FAILURE MODE | START DATE AND TIME OF USE | DATE AND TIME OF OCCURRENCE OF FAILURE | TIME TO FAILURE (hour) | DATE AND TIME OF RECOVERY FROM FAILURE | TIME TO REPAIR (hour) |
|---|---|---|---|---|---|---|---|---|
| AP SERVER GROUP | AP SERVER 1 | HARD DISK | DISC DEFECT | 1999/10/7 0:00 | 2000/12/17 8:30 | 10496 | 2000/12/19 6:00 | 45.5 |
| DB SERVER GROUP | DB SERVER 1 | HARD DISK | DISC DEFECT | 1998/1/20 12:30 | 2001/3/10 15:00 | 27482 | 2001/3/11 10:30 | 19.5 |
| ... | ... | ... | ... | ... | ... | ... | ... | ... |
| ... | ... | ... | ... | ... | ... | ... | ... | ... |
| WEB SERVER GROUP | WEB SERVER 1 | HARD DISK | DISC DEFECT | ... | ... | ... | ... | ... |
| ... | ... | ... | ... | ... | ... | ... | ... | ... |
| ... | ... | ... | ... | ... | ... | ... | ... | ... |

FIG. 5

| INSTRUMENT GROUP | INSTRUMENT | CONSTITUENT | FAILURE MODE | START DATE AND TIME OF USE | DATE AND TIME OF OCCURRENCE OF FAILURE | TIME TO FAILURE (hour) | DATE AND TIME OF RECOVERY FROM FAILURE | TIME TO REPAIR (hour) |
|---|---|---|---|---|---|---|---|---|
| AP SERVER GROUP | AP SERVER 1 | AP-SERVER-1 SOFTWARE | OS FAILURE | 1999/10/7 0:00 | 2000/12/17 8:30 | 10496 | 2000/12/19 6:00 | 45.5 |
| AP SERVER GROUP | AP SERVER 2 | AP-SERVER-2 SOFTWARE | APPLICATION FAILURE | 1998/1/20 12:30 | 2001/3/10 15:00 | 27482 | 2001/3/11 10:30 | 19.5 |
| AP SERVER GROUP | AP SERVER 1 | AP-SERVER-1 SOFTWARE | MIDDLEWARE FAILURE | ... | ... | ... | ... | ... |
| AP SERVER GROUP | AP SERVER 1 | AP-SERVER-1 SOFTWARE | USER INPUT ERROR | ... | ... | ... | ... | ... |
| DB SERVER GROUP | DB SERVER 1 | DB-SERVER-1 SOFTWARE | MIDDLEWARE FAILURE | ... | ... | ... | ... | ... |
| ... | ... | ... | ... | ... | ... | ... | ... | ... |
| ... | ... | ... | ... | ... | ... | ... | ... | ... |
| WEB SERVER GROUP | WEB SERVER 1 | WEB-SERVER-1 SOFTWARE | OS FAILURE | ... | ... | ... | ... | ... |
| ... | ... | ... | ... | ... | ... | ... | ... | ... |
| ... | ... | ... | ... | ... | ... | ... | ... | ... |

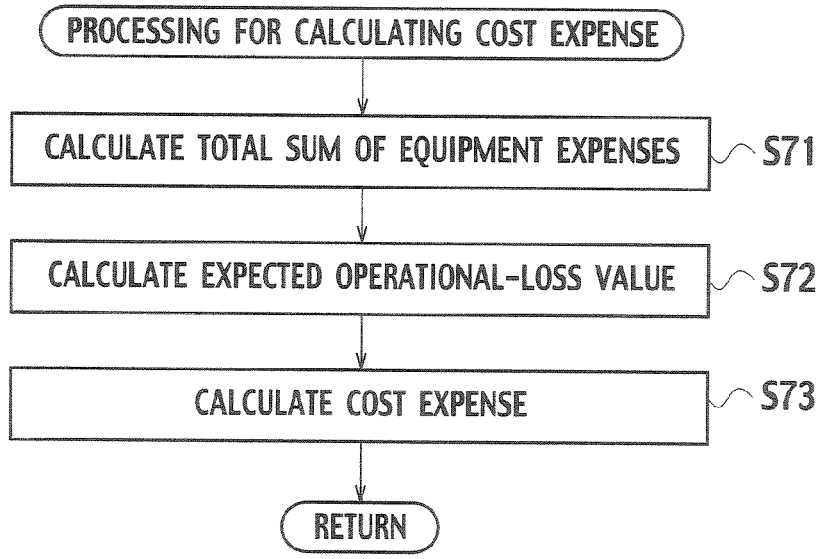
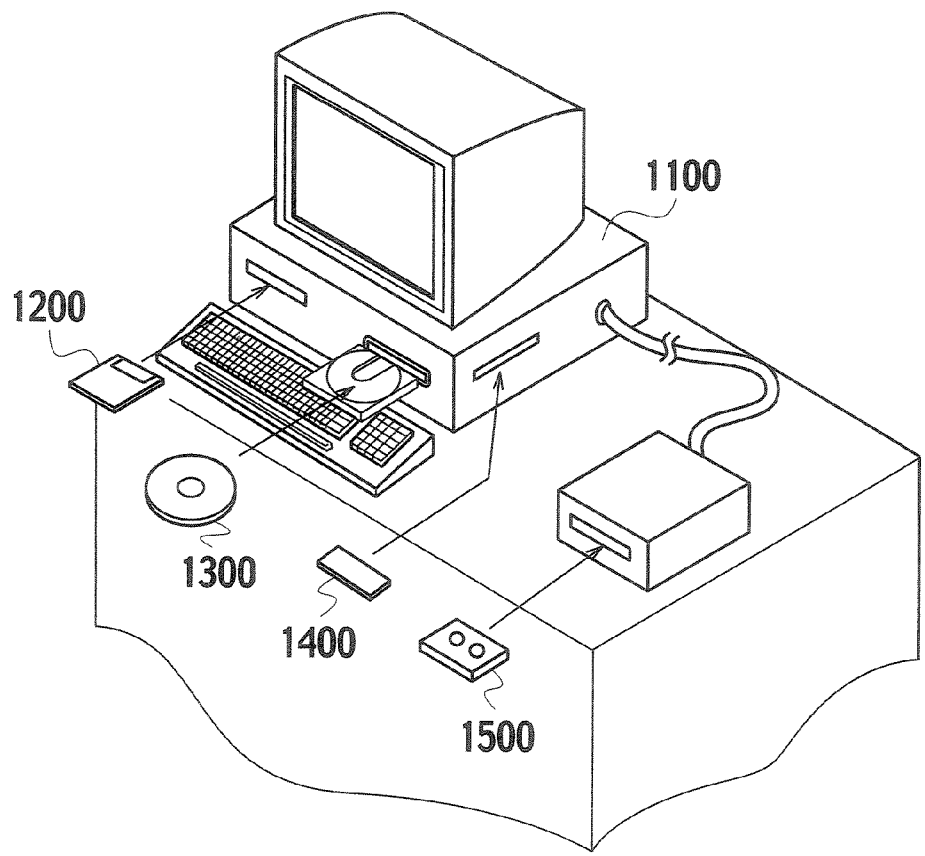

RELIABILITY EVALUATION SYSTEM, RELIABILITY EVALUATING METHOD, AND RELIABILITY EVALUATION PROGRAM FOR INFORMATION SYSTEM

TECHNICAL FIELD

The present invention relates to a reliability evaluation system, a reliability evaluating method, and a reliability evaluation program for an information system such as an online transaction system, which is composed of a computer network.

BACKGROUND ART

In an operation phase of an information system such as an online transaction system which is composed of a computer network or in a design phase of such an information system, reliability of the information system is evaluated. In this reliability evaluation, system availability is evaluated. In this evaluation of system availability, a fault-tree analysis is frequently used (see Kenji Kitagawa, "Saishin Sekkei Shinsa Gijutsu (Latest Design-Review Technique)," Technosystem, Inc., Dec. 4, 1987 (Second Edition), and JP-A Nos. 9-234652 (KOKAI) and 9-237102(KOKAI), for example). For instance, in the evaluation of availability of a system using a nuclear power plant, the following procedures are executed in order to secure safety of the plant. A person who conducts evaluation (hereinafter, an evaluator) envisages an event of trouble, and calculates a probability of incurring such an event. Then, the evaluator quantitatively analyzes that the probability of occurrence of the relevant trouble is at a level of the probability that the trouble may hardly happen. The principal analysis method used at this time is called the fault-tree analysis. This fault-tree analysis is utilized in reliability engineering and related fields thereto, and is also used in information systems (see Kenji Kitagawa, "Saishin Sekkei Shinsa Gijutsu (Latest Design-Review Technique)," Technosystem, Inc., Dec. 4, 1987 (Second Edition), for example).

The technique of evaluating the availability with the fault-tree analysis is as follows. The evaluator firstly selects a top event predicted in a system. Thereafter, the evaluator searches for a first factor leading to this top event, and then derives a logical relationship (AND, OR) between the top event and the first factor. The evaluator expresses the logical relationship by use of a tree structure. In this tree structure, the top event is stated, then a logical symbol is stated below this top event, and then the first factor is stated below this logical symbol. Moreover, in the tree structure, a logical symbol is stated below each first factor, and a second factor is stated below this logical symbol similarly. A series of similar statements is repeated for a third factor and a fourth factor as well. In this way, in the tree structure, segmentation is continued until reaching a sufficient level which allows availability distribution to be referenced as a result of experiments and the like.

By using Boolean algebra, it is indicated that the top event is caused by a combination of lowest-level events (basic events) in the tree structure. By use of this combination (i.e. the tree structure indicating the logical relationship) it is possible to derive unavailability (=1−availability) corresponding to the top event from unavailability (=1−availability) corresponding to the basic events. Accordingly, it is possible to derive the availability corresponding to the top event.

For example, a reliability analysis, which is designed as a conventional reliability evaluation for an information system, produces fault trees on based on an equipment configuration of a plant system, and then calculates degrees of reliability (such as system availability) of the plant system on the basis of failure rates of the respective instruments that constitute the equipment. According to this reliability analysis, the fault trees including variable factors as parameters are produced. Here, the parameters are changed on the basis of a production quantity, the equipment configuration, and the like. Moreover, the degrees of reliability (the system availability) of the plant system are calculated. Then, the calculated degrees of reliability are compared with one another to extract the equipment configuration having the highest degree of reliability (the highest system availability). On the basis of this extracted equipment configuration, the plant system is operated, or a repair strategy for the plant system is selected (see JP-A Nos. 9-234652(KOKAI) and 9-237102(KOKAI), for example). In this way, it is possible to design a plant system so as to sufficiently satisfy a standard value of system availability, and to repair the plant system while operating it with the high system availability.

DISCLOSURE OF THE INVENTION

However, the above-described conventional reliability evaluation has the following problem. Specifically, constituents constituting the information system include not only hardware constituents but also software constituents related to hardware operation. There are also failures attributable to these software constituents. For this reason, it is necessary to evaluate the reliability of the information system in consideration of failure events related to the software constituents as well.

Nevertheless, in the conventional reliability evaluation, only the hardware constituents have been considered as the constituents constituting the information system, and the software constituents have not been considered in the evaluation of the system availability. Consequently, system availability at the time of actually operating the information system sometimes falls below the standard value even when the information system is designed so as to achieve the highest system availability, or even when the information system is modified so as to increase the system availability in an operation phase on the basis of the above-described reliability evaluation, for example.

As a result, there has been a problem that the designing of the information system is more frequently redone, and this causes an enormous burden on a designer of the information system.

The present invention has been made to solve the above problem. Accordingly, it is an object of the present invention to provide a reliability evaluation system, a reliability evaluating method, and a reliability evaluation program for an information system, which are capable of improving system availability and of reducing a burden on a designer who designs the information system.

To solve the problem, a first aspect according to an embodiment of the present invention provides a reliability evaluation system for an information system, which is configured to execute information input to input information, as information necessary for reliability evaluation of the information system provided with the instrument, which information contains at least information concerning constituents respectively indicating software for executing a function of an instrument as well as hardware constituting the instrument, or concerning failures corresponding to failure modes of a constituent group formed of the constituents, system configuration information indicating information concerning a configuration of the information system employing the instrument and any one of the constituents and the constituent group and a standard value of system availability indicating availability of the entire information system. The system then executes an information analysis to obtain analysis information by analyzing the information concerning the failures in the failure modes of any one of the constituents and the constituent group for each of the failure modes. The system then executes fault-tree production to produce a fault tree indicating hierarchical logical relationships from a top event indicating a failure mode of the information system to basic events indicating the failure modes of any one of the constituents and the constituent group on the basis of the system configuration information. Thereafter, the system executes unavailability calculation to calculate unavailability of any one of the constituents and the constituent group corresponding to the failure modes of any one of the constituents and the constituent group one the basis of the analysis information. Then, in a case where the calculated unavailability is supposed to be unavailability corresponding to the basic events equivalent to the failure modes of any one of constituents and the constituent group, the system executes system availability calculation to calculate availability corresponding to the top event on the basis of the unavailability corresponding to the basic events and of the fault tree. Then, the system executes availability determination to determine whether or not the calculated system availability has reached the standard value of the system availability. Moreover, in a case where the calculated system availability is determined to not have reached the standard value, the system executes basic event extraction to extract the basic event related to an increase in the system availability by use of a relationship between variation in the unavailability corresponding to the basic events and variation in the unavailability corresponding to the top event. After that, the system executes first resetting to reset information to be new analysis information corresponding to the extracted basic event in a case where it is possible to reduce the unavailability corresponding to the extracted basic event, and resets information to be new system configuration information and information concerning a failure corresponding to a new failure mode in a case where it is not possible to reduce the unavailability corresponding to the extracted basic event. Moreover, the system executes the unavailability calculating process and the processes thereafter in a case where the new analysis information corresponding to the extracted basic event is reset, and executes the information analysis process and the processes thereafter in a case where the information concerning a new failure in the failure mode corresponding to the extracted basic event is reset, and where the new system configuration information and the information concerning the failure corresponding to the new failure mode are reset.

A second aspect according to the embodiment of the present invention provides a reliability evaluating method for an information system, including the steps of: executing information input to input information, as information necessary for reliability evaluation of the information system provided with the instrument, which information contains at least information concerning constituents respectively indicating software for executing a function of an instrument as well as hardware constituting the instrument, or concerning failures corresponding to failure modes of a constituent group formed of the constituents, system configuration information indicating information concerning a configuration of the information system employing the instrument and any one of the constituents and the constituent group, and a standard value of system availability indicating availability of the entire information system; executing an information analysis to obtain analysis information by analyzing the information concerning the failures in the failure modes of any one of the constituents and the constituent group for each of the failure modes; executing fault-tree production to produce a fault tree indicating hierarchical logical relationships from a top event indicating a failure mode of the information system to basic events indicating the failure modes of any one of the constituents and the constituent group on the basis of the system configuration information; executing unavailability calculation to calculate unavailability of any one of the constituents and the constituent group respectively corresponding to the failure modes of any one of the constituents and the constituent group one the basis of the analysis information; executing, in a case where the calculated unavailability is supposed to be unavailability corresponding to the basic events equivalent to the failure modes of any one of constituents and the constituent group, system availability calculation to calculate availability corresponding to the top event on the basis of the unavailability corresponding to the basic events and of the fault tree; executing availability determination to determine whether or not the calculated system availability has reached the standard value of the system availability; executing, in a case where the calculated system availability is determined to not have reached the standard value, basic event extraction to extract the basic event related to an increase in the system availability by use of a relationship between variation in the unavailability corresponding to the basic events and variation in the unavailability corresponding to the top event; executing first resetting to reset information to be new analysis information corresponding to the extracted basic event in a case where it is possible to reduce the unavailability corresponding to the extracted basic event, and resetting information to be new system configuration information and information concerning a failure corresponding to a new failure mode in a case where it is not possible to reduce the unavailability corresponding to the extracted basic event; executing the unavailability calculation process and the processes thereafter in a case where the new analysis information corresponding to the extracted basic event is reset, and executing the information analyzing process and the processes thereafter in a case where the information concerning a new failure in the failure mode corresponding to the extracted basic event is reset, and where the new system configuration information and the information concerning the failure corresponding to the new failure mode are reset.

A third aspect according to the embodiment of the present invention provides a reliability evaluation program for an information system, which is configured to cause a computer to execute the following processes. Specifically, a first process is to execute information input to input information, as information necessary for reliability evaluation of the information system provided with the instrument, which information contains at least information concerning constituents respectively indicating software for executing a function of an instrument as well as hardware constituting the instrument, or concerning failures corresponding to failure modes of a constituent group formed of the constituents, system configuration information indicating information concerning a configuration of the information system employing the instrument and any one of the constituents and the constituent group, and a standard value of system availability indicating availability of the entire information system. A second process is to execute an information analysis to obtain analysis information by analyzing the information concerning the failures in the failure modes of any one of the constituents and the constituent group for each of the failure mode. A third process is to execute fault-tree production to produce a fault tree indicating hierarchical logical relationships from a top event indicating a failure mode of the information system to basic events indicating the failure modes of any one of the constituents and the constituent group on the basis of the system configuration information. A fourth process is to execute unavailability calculation to calculate unavailability of any one of the constituents and the constituent group respectively corresponding to the failure modes of any of the constituents and the constituent group on the basis of the analysis information. A fifth process is to execute system availability calculation in a case where the calculated unavailability is supposed to be unavailability corresponding to the basic events equivalent to the failure modes of any one of constituents and the constituent group. The system availability calculation is to calculate availability corresponding to the top event on the basis of the unavailability corresponding to the basic events and of the fault tree. A sixth process is to execute availability determination to determine whether or not the calculated system availability meets the standard value of the system availability. A seventh process is to execute, in a case where the calculated system availability is determined to not have reached the standard value, basic event extraction to extract the basic event related to an increase in the system availability by use of a relationship between variation in the unavailability corresponding to the basic events and variation in the unavailability corresponding to the top event. An eighth process is to execute first resetting to reset information to be new analysis information corresponding to the extracted basic event in a case where it is possible to reduce the unavailability corresponding to the extracted basic event, and to reset information to be new system configuration information and information concerning a failure corresponding to a new failure mode in a case where it is not possible to reduce the unavailability corresponding to the extracted basic event. A ninth process is to execute the unavailability calculating process and the processes thereafter in a case where the new analysis information corresponding to the extracted basic event is reset, and to execute the information analyzing process and the processes thereafter in a case where the information concerning a new failure in the failure mode corresponding to the extracted basic event is reset and when the new system configuration information and the information concerning the failure corresponding to the new failure mode are reset.

BRIEF DESCRIPTION OF THE DRAWINGS

FIG. 4 is a view of a classification table showing failure information corresponding to failure modes of hardware constituents of the embodiment of the present invention, which information is classified by being associated with server groups and with the failure modes.

FIG. 5 is a view of a classification table showing failure information corresponding to failure modes of software constituents of the embodiment of the present invention, which information is classified by being associated with server groups and with the failure modes.

FIG. 14 is a flowchart for explaining a process of calculating cost expenses of the embodiment of the present invention.

FIG. 15 is a view showing recording media for storing programs of the embodiment and modified examples of the present invention.

BEST MODE FOR CARRYING OUT THE INVENTION

An embodiment of the present invention will be described below with reference to the accompanying drawings.

(Configuration of Reliability Evaluation System for Information System)

An information system in this embodiment includes multiple instruments (such as servers). Each instrument incorporates software for executing a function of the instrument and hardware that constitutes the instrument. A reliability evaluation system for an information system of this embodiment is configured to execute evaluation of system availability of such an in formation system and cost evaluation.

Figure 1:
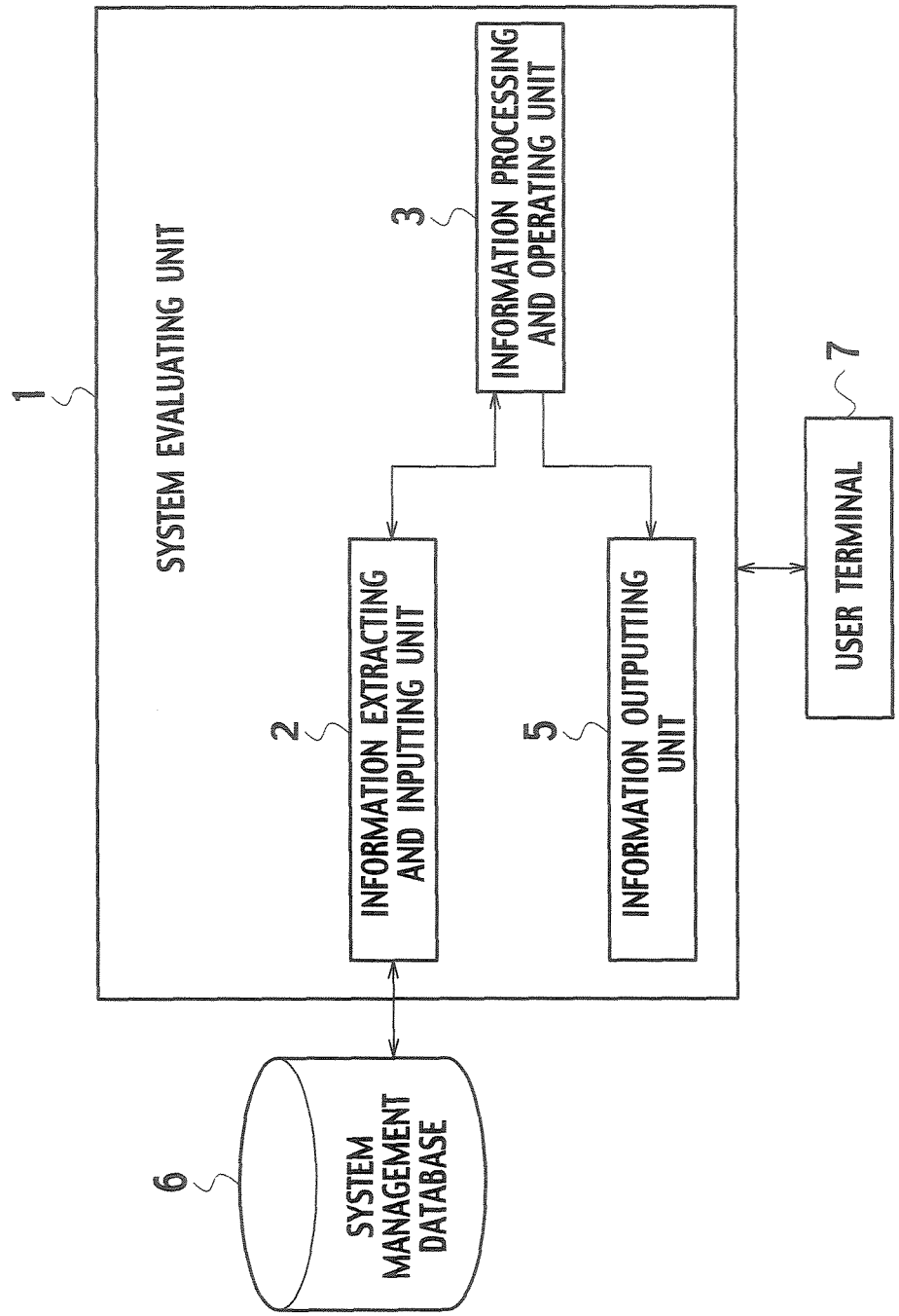
FIG. 1 is a block diagram showing a functional configuration of a reliability evaluation system of an embodiment of the present invention.

FIG. 1 is a view showing a block configuration of a reliability evaluation system for an information system (hereinafter referred to as the reliability evaluation system) of this embodiment. The reliability evaluation system of this embodiment includes a system evaluating unit 1 for exchanging information with a system management database 6 and a user terminal 7.

The system evaluating unit 1 exchanges, with the system management database 6, various pieces of information such as information necessary for reliability evaluation of the information system. Various pieces of information including system functional configuration information 10, reliability-related information 11, cost-related information 13, system standard information 12 and the like are stored in the system management database 6. These pieces of information are inputted to an information processing and operating unit 3 as appropriate.

The system evaluating unit 1 includes an information extracting and inputting unit 2, an information processing and operating unit 3 and an information outputting unit 5. The information extracting and inputting unit 2 extracts information such as the system functional configuration information 10, reliability-related information 11, the system standard information 12 and the like from the system management database 6, and then inputs the information to the information processing and operating unit 3. The information processing and operating unit 3 performs certain processing and operation on the basis of the inputted information. The information outputting unit 5 outputs a result of the certain processing and operation to the user terminal 7.

The user terminal 7 is connected to the system evaluating unit 1. The user terminal 7 is configured to output various pieces of instructing information (such as information for instructing execution of reliability evaluation for a certain information system) to the system evaluating unit 1, to output various information, and to display various information.

The information extracting and inputting unit 2 is an information inputting unit to which information at least containing information (such as the reliability-related information 11 to be described later) concerning failures corresponding to failure modes of constituents (software constituents and hardware constituents to be described later) respectively indicating software for executing functions of the instruments as well as hardware constituting the instruments, system configuration information (such as the system functional configuration information 10 and a system configuration contained in the system standard information 12) indicating information concerning a configuration of the information system employing the instruments and the constituents, and a standard value (such as a standard value of system availability contained in the system standard information 12 to be described later) of system availability indicating availability of the entire information system, are inputted as information necessary for reliability evaluation of the information system provided with the instruments (such as servers).

Moreover, equipment expenses indicating costs necessary for the hardware constituents and for the software constituents, a cost tolerance value indicating an allowable range of the costs necessary for the information system, an amount of loss by system shutdown indicating an operational loss incurred by shutdown of the information system occurs for a unit period, and an operational period of the information system are inputted to the information extracting and inputting unit 2.

Figure 2:
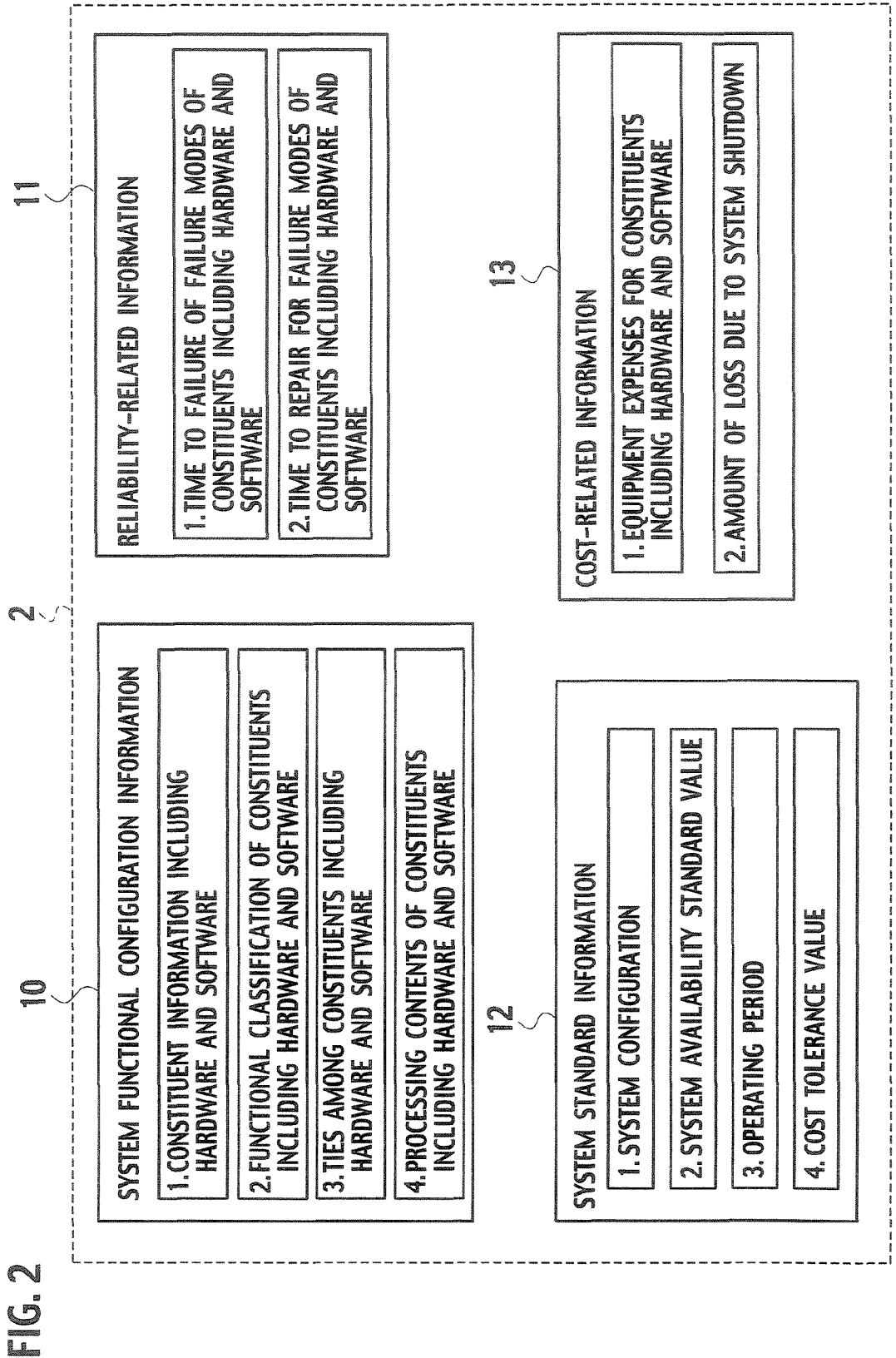
FIG. 2 is a view showing information to be inputted to an information extracting and inputting unit of the embodiment of the present invention.

FIG. 2 is a view showing the information to be inputted to the information extracting and inputting unit 2. The inputted information includes the system functional configuration information 10, the reliability-related information 11, the cost-related information 13, and the system standard information 12. These pieces of information are associated with the information system.

Constituent information including that on the hardware and the software which are part of the information system is included in the system functional configuration information 10. Information on constituents of the hardware (hereinafter, hardware constituents) and that on constituents of the software (hereinafter, software constituents) are included in this constituent information. The hardware constituents are those (such as components and circuits) constituting the instruments (such as servers). The software constituents are those (such as commands or procedures for executing the respective functions which are written in program codes and the like) used for executing functions of the instruments. For example, the instruments constituting the information system include WEB servers 1, 2 and so forth which belong to a WEB server group for providing a user with contents by use of a WEB browser, for example. In other words, the WEB server group is defined as a set of WEB servers 1, 2, and so forth which constitute the information system. In this case, the software constituent corresponding to the WEB server 1 is, for example, WEB-server-1 software for causing the WEB server 1 to execute a function thereof. The hardware constituents corresponding to the WEB server 1 includes, for example, a hard disk, a CPU, a memory, and the like which constitute the WEB server 1.

A functional classification of the constituents including the hardware and the software which are part of the information system is included in the system functional constitution information 10. A functional classification of the hardware constituents and a functional classification of the software constituents are included in the functional classification of the constituents including the hardware and the software. The functional classification of the hardware constituents means information on the respective hardware constituents that are classified in accordance with the functions of the instruments. The functional classification of the software constituents is defined as information on each of the software constituents which are classified in accordance with the functions of the instruments. For example, in the functional classification of the software constituents, a WEB program 1, a WEB program 2, and so forth are classified as being associated with the function of the WEB server 1, and an AP program 1, an AP program 2 and so on are classified as being associated with the function of an AP server 1. The AP server is defined as a server which belongs to an AP server group for executing processing of a work system using a database and the like upon receipt of a request from a user. In other words, the AP server group is defined as a set of AP servers 1, 2, and so forth which constitute the information system.

Ties between the constituents including the hardware and the software which are part of the information system are included in the system functional configuration information 10. The ties between the constituents including the hardware and the software includes ties among the hardware constituents, ties among the software constituents, and ties between the hardware constituent and the software constituent. The ties among the hardware constituents are defined as relationships of electrical connections among the hardware constituents in each instrument, for example. On the other hand, the ties among the software constituents are defined as, for example, a flowchart showing relationships among functional blocks indicating the functions of the software constituents in each instrument. Moreover, the ties between the hardware constituent and the software constituent are defined as information in which each hardware constituent related to the function of the software constituent is associated with the relevant function of the software constituent in each instrument, for example.

Processing contents of the constituents including the hardware and the software which are part of the information system (processing contents of the hardware constituents and processing contents of the software constituents) are included in the system functional configuration information 10.

Times to failure of failure modes of the constituents including the hardware and the software which are part of the information system (times to failure of failure modes of the hardware constituents and times to failure of failure modes of the software constituents), and times to repair for the failure modes of the constituents including the hardware and the software (times to repair for the failure modes of the hardware constituents and times to repair for the failure modes of the software constituents) are included in the reliability-related information 11. For example, the time to failure of the failure mode of the hardware constituent includes a time to failure tx of a disc defect (the failure mode) of a hard disk in the AP server 1, and the time to failure of the failure mode of the software constituent includes a time to failure ty for an OS failure (the failure mode) of the AP software for the AP server 1.

Equipment expenses for the constituents including the hardware and the software which are part of the information system (equipment expenses indicating costs necessary for the hardware constituents and equipment expenses indicating costs necessary for the software constituents) are included in the cost-related information 13. Moreover, the cost-related information 13 includes information on an amount of loss by system shut down indicates an operational loss (which may be either an actual value or a predicted value) incurred by shutdown of the information system for a unit period (for example, one month). These equipment expenses are expenses spent for the constituents including material costs for the hardware constituents and those for the software constituents, expenses necessary for embedding the constituents in the information system, and the like.

The system configuration of the information system is included in the system standard information 12. This system configuration is defined as ties between each of the instruments which are part of the information system. Moreover, a standard value of system availability indicating availability of the entire information system (hereinafter referred to as a system availability standard value), an operation period, and a cost tolerance value indicating an allowable range of the costs spent for the information system are included in the system standard information 12. The information inputted by the information extracting and inputting unit 2 is sent to the information processing and operating unit 3.

Figure 3:
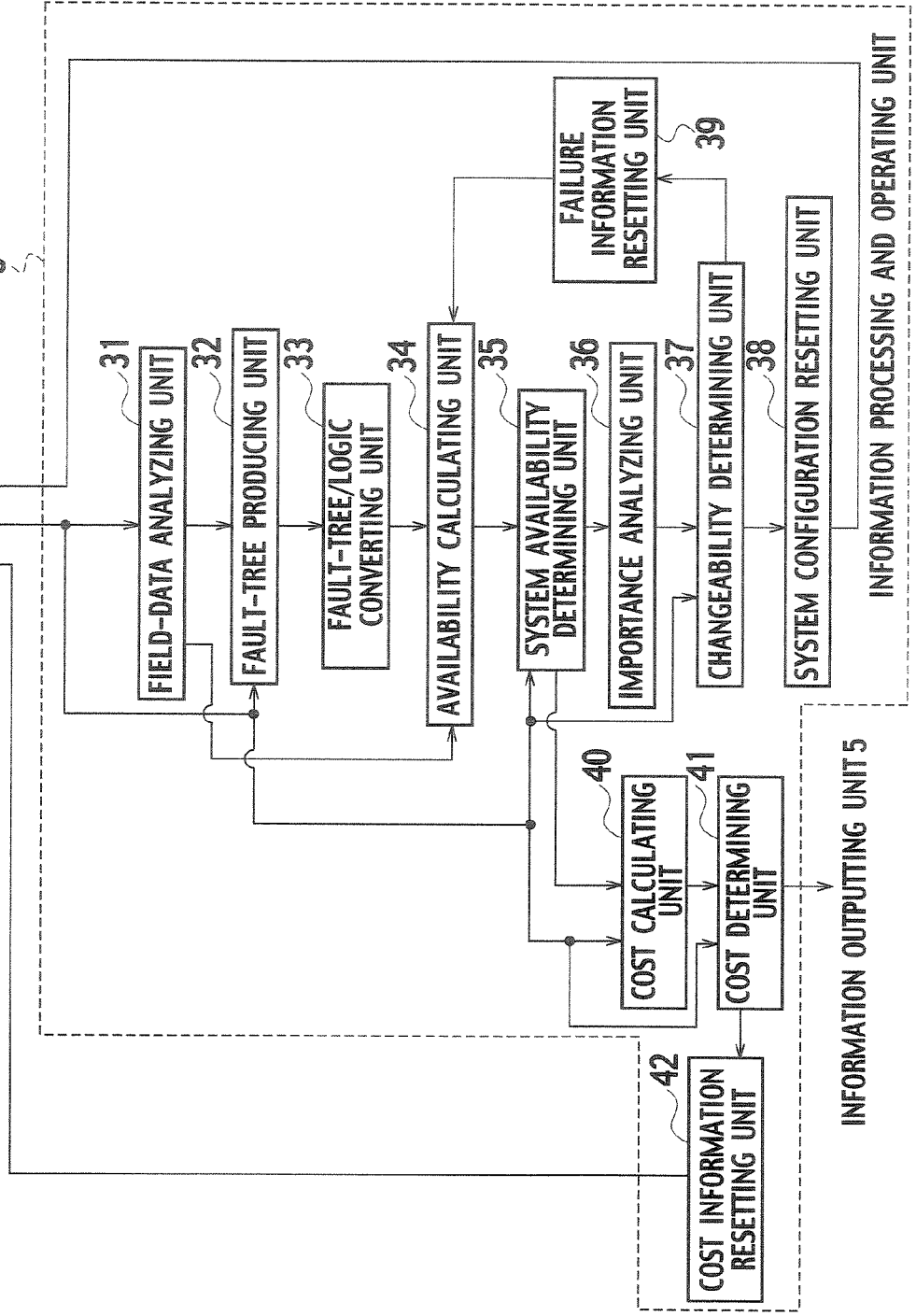
FIG. 3 is a block diagram showing a processing functional configuration of an information processing and operating unit of the embodiment of the present invention.

FIG. 3 is a view showing a detailed configuration of the information processing and operating unit 3. The information processing and operating unit 3 includes a field-data analyzing unit 31, a fault-tree producing unit 32, a fault-tree/logic converting unit 33, an availability calculating unit 34, a system availability determining unit 35, an importance analyzing unit 36, a changeability determining unit 37, a system configuration resetting unit 38, a failure information resetting unit 39, a cost calculating unit 40, a cost determining unit 41, and a cost information resetting unit 42.

The field-data analyzing unit 31 is an information analyzing unit configured to obtain analysis information, as an analysis result, by analyzing information concerning failures in failure modes of the hardware constituents and those of the software constituents for each of the failure modes. For example, the field-data analyzing unit 31 classifies the information concerning the failures corresponding to the failure modes, out of the information inputted by the information extracting and inputting unit 2, for each failure mode and for each instrument group (such as the AP server group or the WEB server group) indicating the set of instruments classified by the processing function of each of the instruments (such as the AP server 1 or the AP server 2) which are part of the information system. Thereby, the field-data analyzing unit 31 performs the above-described analysis on the basis of a result of classification. The concrete explanation is as follows.

For example, failure information (the information concerning the failure) on each failure mode (such as a disc defect of the hard disk of the AP server 1) includes starting date and time of use of the constituent (such as the hard disk of the AP server 1), date and time of occurrence of the failure (such as the disc defect), the time to failure, date and time of recovery from the failure, time to repair and the like. The field-data analyzing unit 31 performs classification by associating the failure mode (for example, the AP server group and the disc defect) with the information (for example, the starting date and time of use, the date and time of occurrence of the failure, the time to failure, the date and time of recovery from the failure, and the time to repair, corresponding to the disc defect of the hard disk of the AP server 1) concerning the failure corresponding to the failure mode out of a variety of inputted information with the instrument group. In this way, the field-data analyzing unit 31 generates a classification table in which the failure information corresponding to the failure modes of the hardware constituents and of the software constituents is classified by being associated with the instrument groups and with the failure modes. FIG. 4 is a view showing a classification table (hereinafter referred to as a hardware classification table) in which the failure information corresponding to the failure modes of the hardware constituents is classified by being associated with the instrument groups and with the failure modes. In the table, the failure information is associated with each relevant instrument group, the instrument, the constituent, and the failure mode (such as the disc defect). FIG. 5 is a view showing a classification table (hereinafter referred to as a software classification table) in which the failure information corresponding to the failure modes of the software constituents is classified by being associated with the instrument groups and the failure modes, where the failure information is associated with each relevant instrument group, the instrument, the constituent, and the failure mode (such as an OS failure, an application failure, a middleware failure or a user input error). Here, a DB server is defined as a server which belongs to a DB server group for managing a database which is part of the information system. In other words, the DB server group indicates a set of DB servers 1, 2 and so forth which constitute the information system.

The field-data analyzing unit 31 calculates a failure probability of the failure mode for each of the failure modes of the hardware constituents (or of the software constituents) by use of the above-described hardware classification table shown in FIG. 4 (or the software classification table shown in FIG. 5). Thereby, the field-data analyzing unit 31 obtains the calculated failure probability as the analysis information. For example, the field-data analyzing unit 31 calculates the failure probability of the failure mode of the hardware constituent (or the software constituent) on the basis of the times to failure (the times to failure of the respective failure modes recorded on the above-described hardware classification table (or the software classification table)) of the failure modes of the hardware constituents (or the software constituents) inputted to the information extracting and the inputting unit 2, and on Weibull distribution indicating distribution of the failure probabilities relative to the times to failure.

Concrete explanation is as follows. For example, the field-data analyzing unit 31 calculates the failure probability employing a Weibull distribution formula by assigning times to failure t1, t2, t3, and so forth corresponding to the disc defect of the hard disk of the AP server 1 recorded on the hardware classification table (or the OS failure of the software for the AP server 1 recorded on the software classification table) to the Weibull distribution formula. For example, a distribution function F(t) of the failure probability employing the time to failure t is expressed by the following Formula 1:

$$F(t) = 1 - \exp\left[-\left(\frac{t}{\theta}\right)^{\beta}\right] \qquad \text{[Formula 1]}$$

Here, $\beta$ denotes a geometry parameter, and $\theta$ denotes a scale parameter. The field-data analyzing unit 31 can determine (estimate) $\beta$ and $\theta$ by assigning the above-mentioned t1, t2, t3, and so forth to the distribution expressed by Formula 1.

In this way, the field-data analyzing unit 31 can calculate the failure probabilities F(t) of the hardware constituents and of the software constituents.

Incidentally, a failure pattern is classified into any of an early failure pattern in which a failure rate decreases over time; an accidental failure pattern in which a failure rate is constant irrespective of a course of time; and an aging failure pattern in which a failure rate is increased over time. Here, a case where $\beta<1$ corresponds to the early failure pattern, a case where $\beta=1$ corresponds to the accidental failure pattern, and a case where $\beta>1$ corresponds to the aging failure pattern. Hence the failure probability calculated as described above corresponds to one of all of the failure patterns.

Moreover, the field-data analyzing unit 31 calculates mean time to repair representing an average value of the time to repair for each of the failure modes of the hardware constituents (or of the software constituents) by use of the above-described hardware classification table (or the software classification table), and thereby obtains the calculated mean time to repair as the analysis information.

Note that the field-data analyzing unit 31 may calculate the time to failure by use of starting date and time of use and of the date and time of occurrence of the failure, and then calculate the failure probability by use of the derived time to failure. Alternatively, the field-data analyzing unit 31 may derive the time to repair by use of the date and time of occurrence of the failure and of the date and time of recovery from the failure, and then calculate the mean time to repair by use of the derived time to repair. The information analyzed by the field-data analyzing unit 31 is sent to the availability calculating unit 34 as the analysis information.

The fault-tree producing unit 32 produces a fault tree indicating hierarchical logical relationships from the top event indicating the failure mode of the information system to basic events indicating the failure modes of the hardware constituents or of the software constituents. Here, the fault tree is produced on the basis of the system configuration information (such as the system functional configuration information 10 or the system configuration contained in the system standard information 12) sent from the information extracting and inputting unit 2. This fault tree shows the hierarchical logical relationships from the top event to the basic events in a case where a loss of function of the entire information system or an unfavorable event during operation and action is defined as the top event, and where the failure modes of the hardware constituents and the failure modes of the software constituents with which any further factors cannot be obtained, are defined as the basic events. That is, in the fault tree, the events developed as the relationships between the events and the factors are linked with one another by use of logical symbols (for example, OR symbols, AND symbols and the like).

To be more precise, the fault-tree producing unit 32 produces the fault tree as described below. The constituent information, which includes information on the hardware and the software, and which is inputted from the information extracting and inputting unit 2, the functional classification of the constituents including the hardware and the software, the ties among the constituents including the hardware and the software, the processing contents of the constituents including the hardware and the software, and the system configuration are inputted to the fault-tree producing unit 32. The fault-tree producing unit 32 then produces the fault tree on the basis of the inputted information.

Production of a fault tree on the basis of functional classification of hardware constituents, ties among the hardware constituents, processing contents of the hardware constituents, and a system configuration is a well-known technique. In this embodiment, it is also possible to produce the fault tree in a similar manner to this well-known technique. Accordingly, detailed explanation on the fault-tree production will be omitted herein.

FIG. 6 to FIG. 12 are views respectively showing examples of fault trees produced by the fault-tree producing unit 32. Here, the information system as an evaluation target is supposed to include the Web server group, the AP server group and the DB server group as described previously. Each server group is supposed to be consisted of two servers. Each server is supposed to include multiple hardware constituents (a hard disk, a CPU, a memory and the like). The software constituents for executing functions of the respective servers are defined as Web-server-1 software, Web-server-2 software, AP-server-1 software, and so forth. The failure modes of the software constituents include an OS failure, an application failure, a middleware failure and a user input error. Note that failure events (such as a disc defect of the hard disk of the Web server 1) subordinate to the failure events (such as a loss of function of the Web-server-1 hardware or a loss of function of the Web-server-2 hardware) of the hardware in each of the servers are omitted in FIG. 6 to FIG. 12. However, there may be a case where failure events are logically connected to those at the lower levels of the hardware in each of the servers by use of the AND symbols or the OR symbols.

Figure 6:
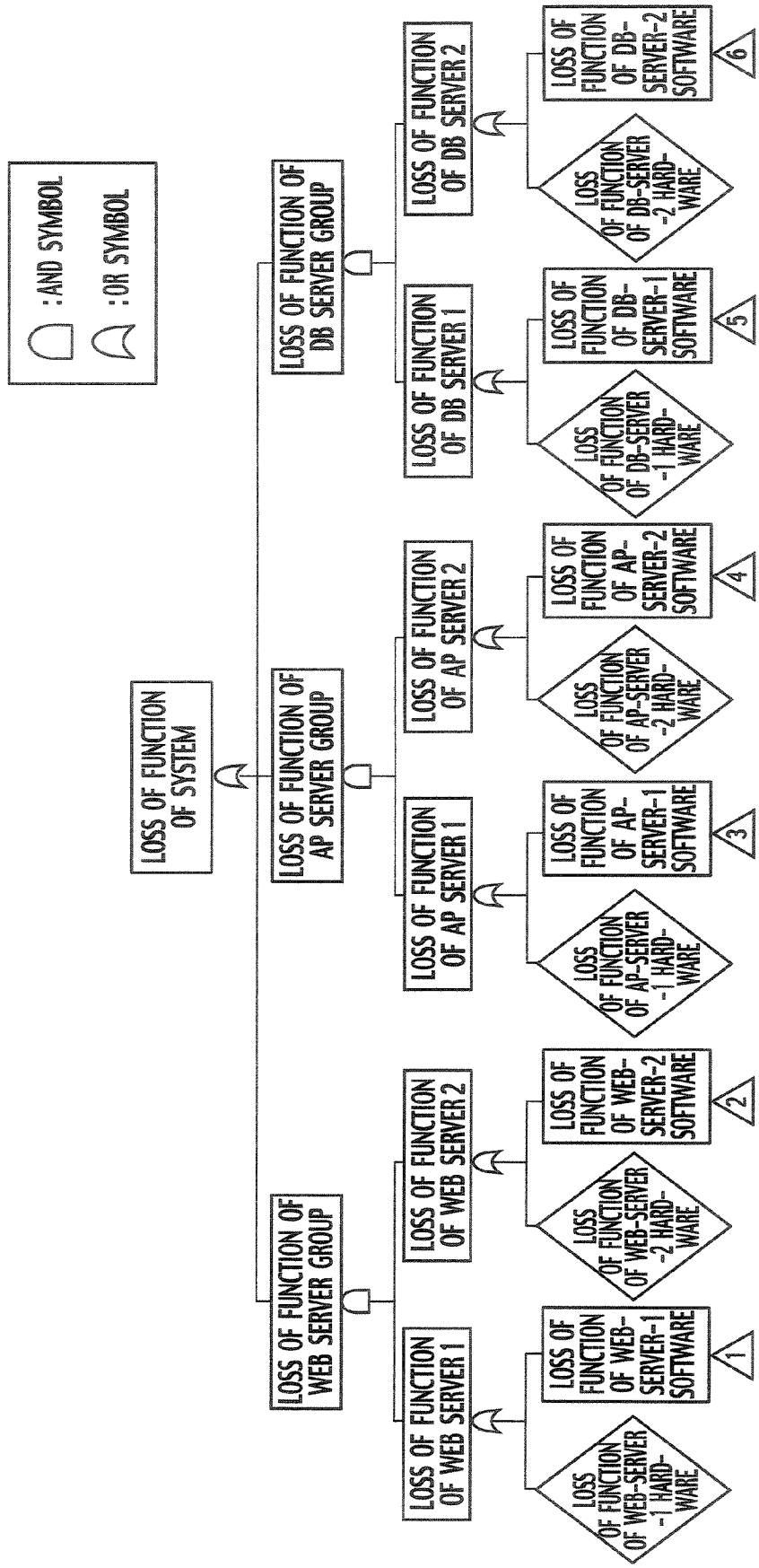
FIG. 6 is a view showing an example of a fault tree produced by a fault-tree producing unit of the embodiment of the present invention.
Figure 7:
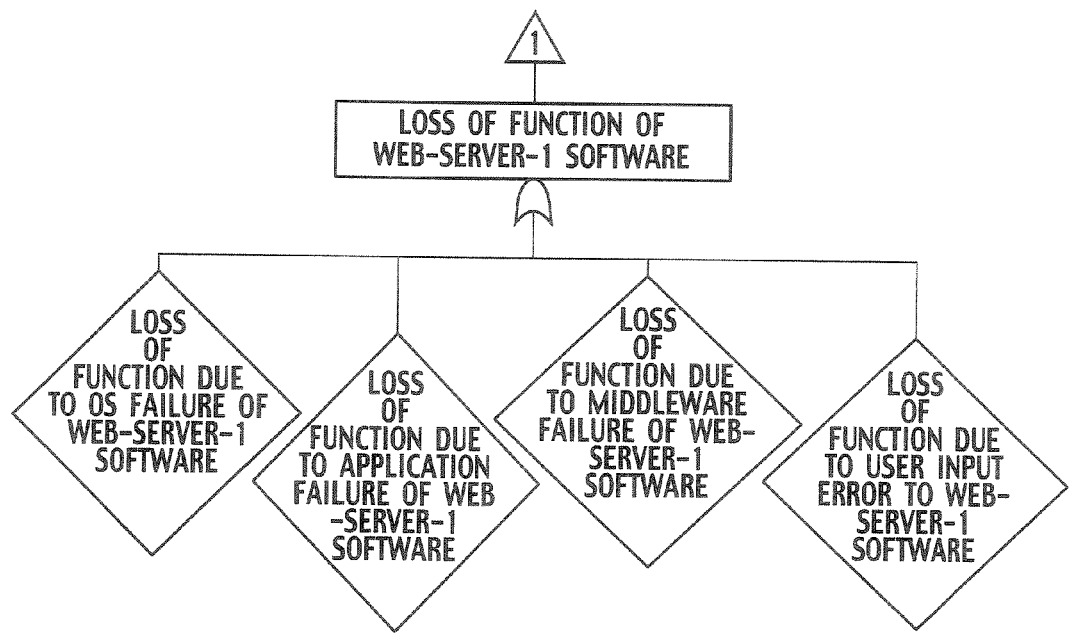
FIG. 7 is a view showing an example of the fault tree produced by the fault-tree producing unit of the embodiment of the present invention.
Figure 8:
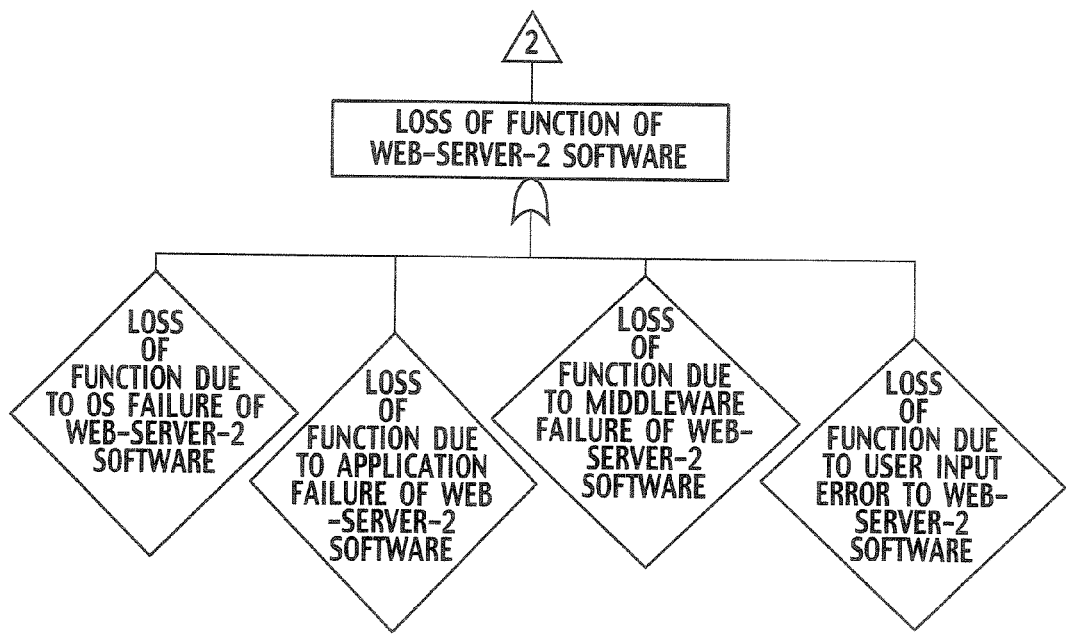
FIG. 8 is a view showing an example of the fault tree produced by the fault-tree producing unit of the embodiment of the present invention.
Figure 9:
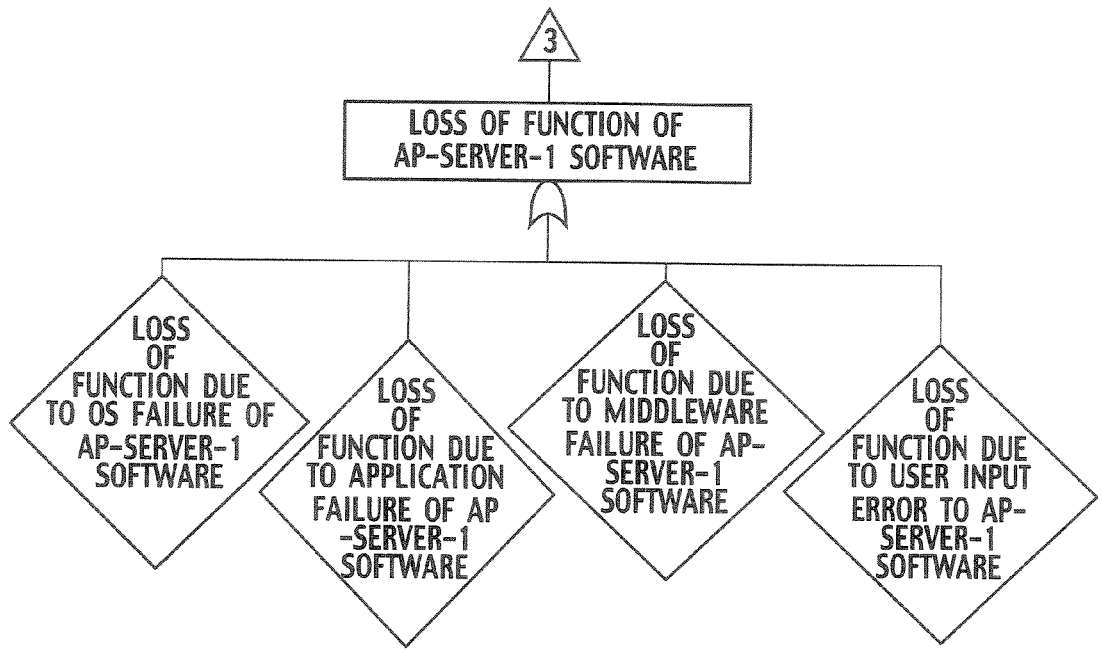
FIG. 9 is a view showing an example of the fault tree produced by the fault-tree producing unit of the embodiment of the present invention.
Figure 10:
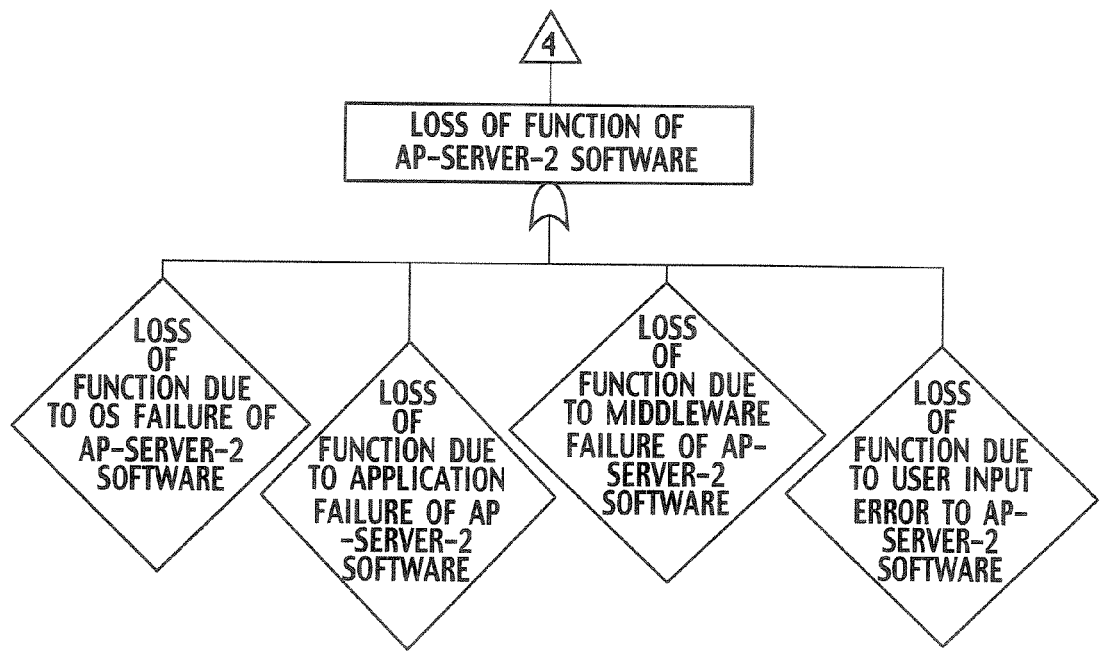
FIG. 10 is a view showing an example of the fault tree produced by the fault-tree producing unit of the embodiment of the present invention.
Figure 11:
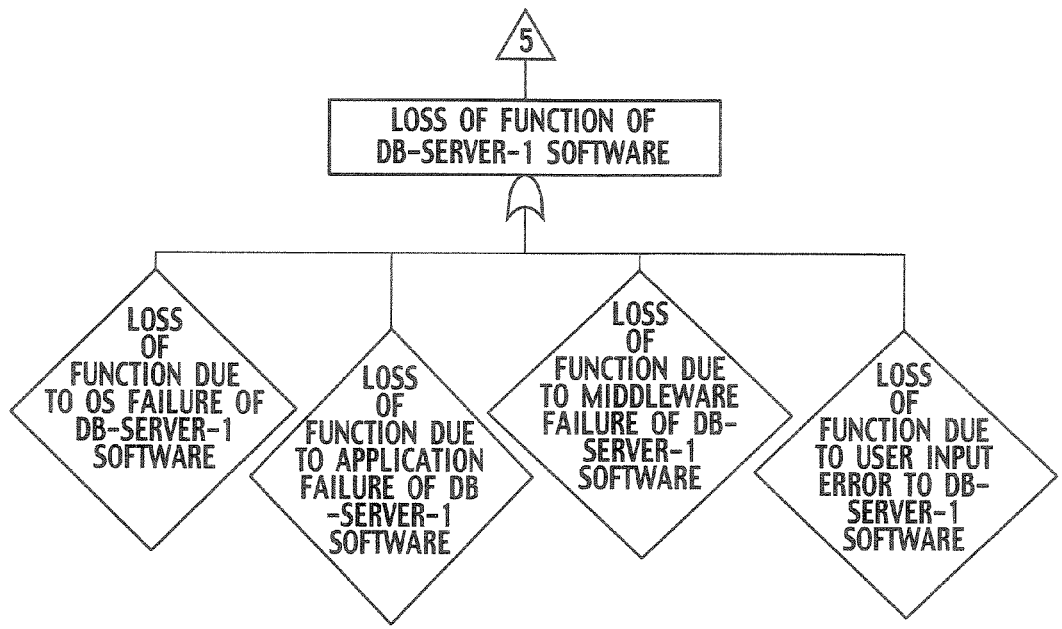
FIG. 11 is a view showing an example of the fault tree produced by the fault-tree producing unit of the embodiment of the present invention.
Figure 12:
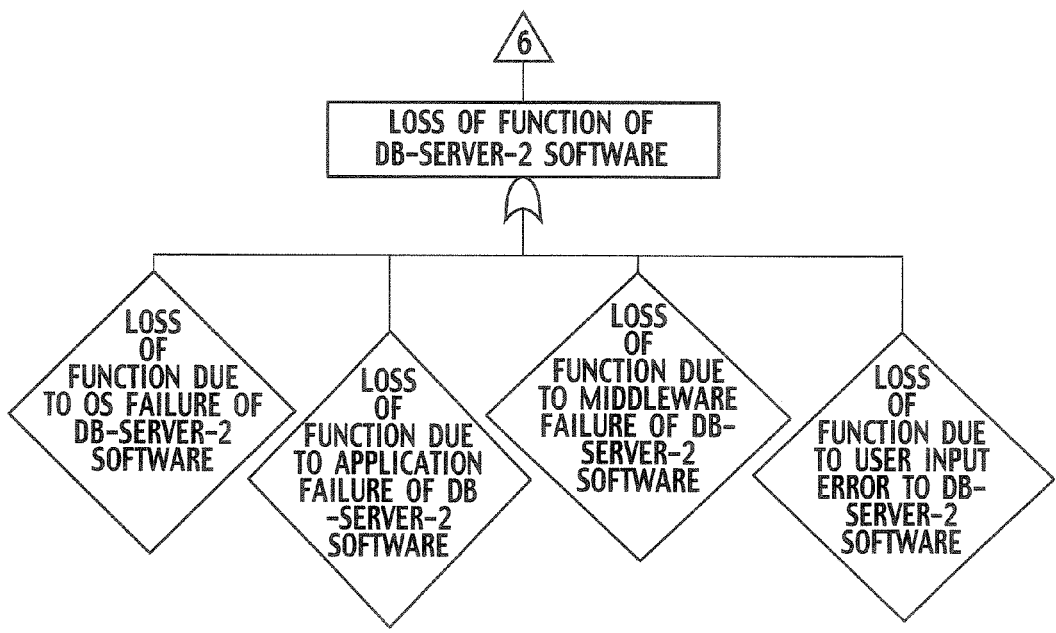
FIG. 12 is a view showing an example of the fault tree produced by the fault-tree producing unit of the embodiment of the present invention.

In FIG. 6, a top event (an event indicating a failure of the entire information system, such as a loss of function of the system) is connected to first-level events (events located one step hierarchically lower than the top event, such as a loss of function of the WEB server group) by use of the logical symbols such as the AND symbols or the OR symbols. Moreover, in FIG. 6, the first-level events are connected to second-level events (events located two steps hierarchically lower than the top event, such as a loss of function of the WEB server 1) by use of the above logical symbols. Furthermore, in FIG. 6, the second-tier events are connected to third-level events (events located three steps hierarchically lower than the top event, such as a loss of function of the hardware in the WEB server 1 or a loss of function of the software for the WEB server 1) by use of the logical symbols. Here, the failure events of the hardware in each of the servers (such as a loss of function of the WEB-server-1 hardware) out of the third-level events constitute the basic events concerning the hardware failures. Meanwhile, as shown in FIG. 7 to FIG. 12, fourth-level events (such as an OS failure of the WEB-server-1 software, an application failure, a middleware failure or a user input error) are connected to the failure events of the software for each of the servers (such as a loss of function of the WEB-server-1 software) out of the third-level events by use of the logical symbols. Here, the fourth-level events shown in FIG. 7 to FIG. 12 constitute the basic events concerning the software failures.

In such a fault tree, when representing the hierarchical logical relationships from the top event to the basic events, the respective events (the first-level events, the second-level events, the third-level events and the basic events) include not only the failure events concerning the hardware but also the failure events concerning the software. The produced fault tree is sent to the fault-tree/logic converting unit 33.

The fault-tree/logic converting unit 33 converts the data in the fault tree into predetermined relational expressions to be described later by use of Boolean algebra. Concrete explanation is as follows.

In FIG. 6 to FIG. 12, in a case of a certain event (for example, the loss of function of the WEB-server-1 software) is connected to the multiple subordinate events (the OS failure of the WEB-server-1 software, the application failure, the middleware failure and the user input error, concerning the WEB-server-1 software) by use of the OR symbols, the certain event occurs upon occurrence of any of the above multiple subordinate events (for example, the OS failure). For this reason, supposing that the unavailability (=1−availability) corresponding to the certain event is defined as q, and that unavailability corresponding to the events subordinate to the certain event is defined as qj, when the certain event is connected to the events subordinate to this certain event by use of the OR symbols, unavailability q of the certain event is calculated by the following Formula 2 by use of the Boolean algebra:

$$q = 1 - \prod_{j=1}^{N}(1-qj) \quad \text{[Formula 2]}$$

Here, N denotes a total number of the subordinate events.

On the other hand, in FIG. 6 to FIG. 12, when a certain event (such as the loss of function of the WEB server group) is connected to the multiple subordinate events (the loss of function of the WEB server 1 and the loss of function of the WEB server 2, for example) by use of the AND symbols, the certain event occurs upon occurrence of all of the multiple subordinate events (the loss of function of the WEB server 1 and the loss of function of the WEB server 2, for example). For this reason, supposing that the unavailability (=1−availability) corresponding to the certain event is defined as q, and that unavailability corresponding to the events subordinate to the certain event is defined as qj, when the certain event is connected to the events subordinate to this certain event by use of the AND symbols, unavailability q of the certain event is calculated by the following Formula 3 by use of the Boolean algebra:

$$q = \prod_{j=1}^{N} qj \quad \text{[Formula 3]}$$

Here, N denotes a total number of the subordinate events.

The fault-tree/logic converting unit 33 converts the data in the fault tree into the predetermined relational expressions concerning the unavailability q of the top event by use of the fault trees in FIG. 6 to FIG. 12, Formula 2 and Formula 3. In the predetermined relational expressions, the unavailability q corresponding to the top event is expressed by the predetermined expressions using qj (qj is the unavailability of the basic events where j=1 to N, and N is the number of the basic events), for example. The predetermined relational expressions are sent to the availability calculating unit 34.

The availability calculating unit 34 has the following two functions. Specifically, an unavailability calculating function is for calculating the unavailability corresponding to the failure modes of the hardware constituents and the software constituents on the basis of the analysis information (the calculated failure probabilities of the respective failure modes and the mean time to repair) as an analysis result from the field-data analyzing unit 31. The system availability calculating function is for calculating availability corresponding to the top event as system availability on the basis of the unavailability corresponding to the basic events (such as the unavailability of the hard disk attributable to the disc defect) and the predetermined relational expression concerning the unavailability q of the top event, on condition that the calculated unavailability is defined as the unavailability corresponding to the basic events equivalent to the failure modes of the hardware constituents and the software constituents. That is, the availability calculating unit 34 functions as the unavailability calculating unit and as the system availability calculating unit. Concrete explanation is as follows.

First, the availability calculating unit 34 calculates the availability corresponding to each of the basic events included in the fault tree by means of evaluation employing Monte Carlo simulation. The availability corresponding to the basic events are calculated by 1−(the unavailability corresponding to the basic events), for example. Here, the field-data analyzing unit 31 outputs the calculated failure probabilities F(t) of the respective failure modes to the availability calculating unit 34. The failure probability F(t) represents the probability of occurrence of a failure before or at the time t. A failure rate p(t) is defined as a probability (p(t)=(dF(t)/dt)/(1−F(t)) of occurrence of the failure per unit time at the time t supposing that a period from the time 0 each of the failure modes is repaired to the time t remains in a normal state. The availability calculating unit 34 calculates the availability corresponding to each of the basic events as follows.

(1) In a case where a starting time of simulation evaluation (hereinafter, evaluation start time) is defined as $t_0$, and that an end time of the simulation evaluation (hereinafter, an evaluation end time) is defined as $t_e$; the availability calculating unit 34 recognizes that no failures corresponding to the basic events occur at the evaluation start time $t_0$, and that the hardware constituents or the software constituents corresponding to the basic events are in the normal state. That is, the availability calculating unit 34 recognizes that both of the probability $F(t_0)$ of occurrence of the failures corresponding to the basic events and the failure rate $p(t_0)$ are equal to 0.

(2) A probability of occurrence of a failure corresponding to a basic event (a probability that a hardware constituent or a software constituent corresponding to the basic event causes the failure) in a period from a simulation evaluation time (hereinafter, evaluation time) $t_0$ to an evaluation time $t_0+dt$ (=$t_1$) is defined as $p(t_0+dt/2)dt$. The availability calculating unit 34 compares the above-described probability $p(t_0+dt/2)dt$ with a random number r1 generated in a range of 0 to 1, and then, if $p(t_0+dt/2)dt \geq r1$, recognizes that the hardware constituent or the software constituent (hereinafter simply referred to as the constituent) has moved to a failure state corresponding to the basic event. The availability calculating unit 34 does not add time starting from the above-described recognition of transition of the state to a time when the failure corresponding to the basic event is repaired, and when the constituent is restituted to the normal state, to accumulated operating time corresponding to the basic event. The accumulated operating time corresponding to the basic event indicates a time period in which the constituent corresponding to the basic event is operated within the period from the evaluation start time to the evaluation end time. The availability calculating unit 34 adds dt to failure time 0corresponding to the basic event. The failure time corresponding to the basic event indicates a time period in which the constituent corresponding to the basic event is in failure. This failure time is cleared to be 0 once the constituent is restituted to the normal state.

The availability calculating unit 34 compares the above-described probability of occurrence of the failure corresponding to the basic event with the random number r1 generated in the range of 0 to 1, and then, if $p(t_0+dt/2)dt<r1$, recognizes that the constituent remains in the normal state. In this case, the availability calculating unit 34 adds the time dt to the accumulated operating time 0 corresponding to the basic event.

(3) Next, the availability calculating unit 34 evaluates state transition of the constituent corresponding to the basic event in a period from the evaluation time $t_1$ to evaluation time $t_1$+dt (=$t_2$).

The availability calculating unit 34 performs the processing similar to above in a case where the constituent corresponding to the basic event is in the normal state at the evaluation time $t_1$. Concrete procedures are as follows. As similar to the above description, a probability of occurrence of the failure of the constituent corresponding to the basic event in a period from the evaluation time $t_1$ to the evaluation time $t_1$+dt is defined as $p(t_1+dt/2)dt$.

The availability calculating unit 34 compares the probability $p(t_1+dt/2)dt$ with a random number r2 generated in the range of 0 to 1, and then, if $p(t_1+dt/2)dt \geq r2$, recognizes that the constituent has moved to the failure state. The availability calculating unit 34 does not add time starting from the above-described recognition of transition of the state to a time when the failure corresponding to the basic event is repaired, and when the constituent is restituted to the normal state, to the accumulated operating time corresponding to the basic event. The availability calculating unit 34 adds the time dt to the failure time corresponding to the basic event.

The availability calculating unit 34 compares the above-described probability $p(t_1+dt/2)dt$ with the random number r2 generated in the range of 0 to 1, and then, if $p(t_1+dt/2)dt < r2$, recognizes that the constituent remains in the normal state. In this case, the availability calculating unit 34 adds the time dt to the accumulated operating time corresponding to the basic event.

Further, the above-described processing (3) is repeated by incrementing the evaluation time $t_1$ by dt such as $t_2$ (=$t_1$+dt), $t_3$ (=$t_1$+dt), $t_4$ (=$t_1$+dt), ..., $t_n$ (=$t_{n-1}$+dt).

Note that the availability calculating unit 34 compares the failure time corresponding to the basic event with the mean time to repair for the failure mode corresponding to the basic event in parallel to the above-described processing, and determines whether or not the failure time corresponding to the basic event reaches the mean time to repair. When the failure time corresponding to the basic event reaches the mean time to repair, the availability calculating unit 34 recognizes that the constituent corresponding to the basic event is restituted to the normal state. In this case, the availability calculating unit 34 resets the failure time corresponding to the basic event to 0, and also resets the failure rate and the failure probability to 0. Then, supposing that the time when the failure rate and the like are reset is defined as $t_m$, the availability calculating unit 34 performs processing stated in (4).

(4) A probability of occurrence of the failure per time interval in which the failure corresponding to the basic event occurs within a period from the evaluation time $t_m$ to evaluation time $t_m$+dt (=$t_{m+1}$) is defined as $p(t_m-t_m+dt/2)dt$. The availability calculating unit 34 compares the above-described probability $p(t_m-t_m+dt/2)dt$ with a random number r3 generated in the range of 0 to 1, and then, if $p(t_m-t_m+dt/2)dt \geq r3$, recognizes that the constituent has moved to the failure state corresponding to the basic event. The availability calculating unit 34 does not add time starting from the above-described recognition of transition of the state to a time when the failure corresponding to the basic event is repaired, and when the constituent is restituted to the normal state, to the accumulated operating time corresponding to the basic event. The availability calculating unit 34 adds dt to the failure time 0 corresponding to the basic event. The failure time corresponding to the basic event indicates the time period in which the constituent corresponding to the basic event is in failure. This failure time is cleared to be 0 once the constituent is restituted to the normal state.

The availability calculating unit 34 compares the above-described probability of occurrence of the failure corresponding to the basic event with the random number r3 generated in the range of 0 to 1, and then, if $p(t_m-t_m+dt/2)dt < r3$, recognizes that the constituent remains in the normal state. In this case, the availability calculating unit 34 adds the time dt to the accumulated operating time corresponding to the basic event.

Next, the availability calculating unit 34 evaluates the state transition of the constituent corresponding to the basic event in a period from the time $t_{m+1}$ to evaluation time $t_{m+1}$+dt (=$t_{m+2}$).

The availability calculating unit 34 executes similar processing to the above in a case where the constituent corresponding to the basic event is in the normal state at the evaluation time $t_{m+1}$. Concrete explanation is as follows. As similar to the above description, a probability of occurrence of the failure per time interval in which the failure corresponding to the basic event occurs within a period from the evaluation time $t_{m+1}$ to evaluation time $t_{m+1}$+dt is defined as $p(t_{m+1}-t_m+dt/2)dt$.

The availability calculating unit 34 compares the probability $p(t_{m+1}-t_m+dt/2)dt$ with a random number r4 generated in the range of 0 to 1, and then, if $p(t_{m+1}-t_m+dt/2)dt \geq r4$, recognizes that the constituent has moved to the failure state corresponding to the basic event. The availability calculating unit 34 does not add time starting from the above-described recognition of transition of the state to a time when the failure corresponding to the basic event is repaired, and when the constituent is restituted to the normal state, to the accumulated operating time corresponding to the basic event. The availability calculating unit 34 adds dt to the failure time corresponding to the basic event.

The availability calculating unit 34 compares the above-described probability $p(t_{m+1}-t_m+dt/2)dt$ with the random number r4 generated in the range of 0 to 1, and then, if $p(t_m-t_m+dt/2)dt < r4$, recognizes that the constituent remains in the normal state. In this case, the availability calculating unit 34 adds the time dt to the accumulated operating time corresponding to the basic event.

Furthermore, the above-described processing is repeated by incrementing the evaluation time by dt, such as $t_{m+3}$ (=$t_{m+2}$+dt) $t_{m+4}$ (=$t_{m+3}$+dt), ..., $t_n$ (=$t_{n-1}$+dt).

Note that the availability calculating unit 34 compares the failure time corresponding to the basic event with the mean time to repair for the failure mode corresponding to the basic event, in parallel to the above-described processing, and determines whether or not the failure time corresponding to the basic event reaches the mean time to repair. In a case where the failure time corresponding to the basic event reaches the mean time to repair, the availability calculating unit 34 recognizes that the constituent corresponding to the basic event is restituted to the normal state. In this case, the availability calculating unit 34 resets the failure time corresponding to the basic event to 0, and also resets the failure rate as well as the failure probability to 0. Then, supposing that the time when the failure rate and the like are reset is defined as $t_k$, the availability calculating unit 34 performs processing which is equivalent to the above-described processing (4) while replacing $t_m$ with $t_k$.

(5) The availability calculating unit 34 repeats a series of above-described processing (2), (3) and (4) until the evaluation time reaches $t_e$.

Incidentally, the time to repair for each of the failure modes preset in the availability calculating unit 34 may be used instead of the mean time to repair.

When the evaluation time reaches $t_e$, the availability calculating unit 34 calculates a value obtained by dividing the accumulated operating time corresponding to the basic event by the evaluation time ($t_e-t_0$) as the availability corresponding to the basic event. Thereafter, the availability calculating unit 34 similarly performs the above-described simulation evaluation for all of the basic events included in the fault tree, and then calculates the availability corresponding to the basic events.

Note that the above description shows the procedures for calculating the availability corresponding to the basic events by simulating, with the Monte Carlo method, temporal behaviors of the constituents corresponding to the basic events during state transitions thereof in the normal state or in the failure state. The state-transition behavior obtained by the above-described series of procedures (which is termed as a history in the field of the Monte Carlo simulation) is one of all of the histories to be stochastically predicted. Hence, the value of availability calculated from this single history indicates one point in statistical fluctuation of the availability. For this reason, to evaluate a statistical average value of the availability, the availability calculating unit 34 needs to calculate the statistical average value of the availability by repeating generation of different random numbers many times in the above-described series of procedures, and thereby obtaining numerous histories. The statistical average value of the availability gradually converges on a specific value in accordance with an increase in the number of histories. In the above-described simulation evaluation for calculating the availability, it is preferable that an evaluation error range of the availability to be evaluated be preset, and that the above series of procedures be repeated until a range of convergence (a range of fluctuation) of the statistical average value of the availability falls within the evaluation error range.

Next, since the unavailability (=1−availability) is obtained out of the availability corresponding to the basic events calculated in the above-described simulation evaluation, the availability calculating unit 34 calculates the unavailability corresponding to the top event as the system unavailability on the basis of the unavailability q1, q2, ..., qn corresponding to the basic events sent from the fault-tree/logic converting unit 33, and on the basis of the predetermined relational expressions concerning the unavailability q of the top event. Thereafter, the availability calculating unit 34 calculates the system availability (=1−system unavailability) therefrom.

The system availability determining unit 35 determines whether or not the system availability calculated by the availability calculating unit 34 is equal to or above the system availability standard value from the information extracting and inputting unit 2. If the calculated system availability is smaller than the system availability standard value, the availability calculating unit 34 outputs information indicating this fact to the importance analyzing unit 36. In contrast, if the calculated system availability is equal to or above the system availability standard value, the availability calculating unit 34 outputs information indicating this fact to the cost calculating unit 40.

The importance analyzing unit 36 is a basic event extracting unit configured to extract the basic event related to an increase in the system availability by use of a relationship between variation in the unavailability corresponding to the basic events and variation in the unavailability corresponding to the top event in a case where it is determined that the calculated system availability does not meet the standard value. Concrete explanation thereof is as follows.

The importance analyzing unit 36 analyzes as to how much each of the basic events (the failure modes of the hardware constituents and the failure modes of the software constituents) has an influence on the system unavailability (1−system availability) calculated by the availability calculating unit 34 on the basis of the inputted information indicating the fact. For example, the importance analyzing unit 36 calculates contributions of the variation in the system unavailability (1−system availability) of the top event by changing the unavailability (1−availability) of each of the basic events. Then, the importance analyzing unit 36 extracts an important basic event for reducing the system unavailability, i.e., for increasing (improving) the system availability, on the basis of the calculated contributions. Thereby, the importance analyzing unit 36 extracts the constituent corresponding to this basic event. For example, the importance analyzing unit 36 calculates, for each of the basic events, probability importance, which is a scale for indicating how much the increase or decrease in the unavailability corresponding to each of the basic events contribute to the increase or decrease in the unavailability corresponding to the top event.

Thereafter, the importance analyzing unit 36 extracts the basic event (such as the OS failure in the AP-server-2 software for the AP server 2), which contributes the most to the increase in the availability corresponding to the top event. Then, the importance analyzing unit 36 extracts the constituent (such as the AP-server-2 software) corresponding to the basic event. The information extracted by the importance analyzing unit 36 is sent to the changeability determining unit 37.

On the basis of the basic event and the constituent extracted by the importance analyzing unit 36, the changeability determining unit 37 determines whether or not it is possible to increase the availability corresponding to the basic event (or to reduce the unavailability corresponding to the basic event). Concrete explanation thereof is as follows.

Summarized data of the failure probabilities corresponding to the failure modes of the respective constituents (hereinafter failure probability summary data) are stored in the system management database 6. Moreover, summarized data of the mean time to repair corresponding to the failure modes of the respective constituents (hereinafter, mean time to repair summary data) are stored in the system management database 6. If a failure probability corresponding to a failure mode of a certain constituent is recorded on the failure probability summary data, then it is supposed that there is a constituent operated at that failure probability. In contrast, if the failure probability corresponding to the failure mode of the certain constituent is recorded on the mean time to repair summary data, then it is supposed that it is possible to recover the failure in this time to repair.

By referring to the failure probability summary data sent by way of the information extracting and inputting unit 2, the changeability determining unit 37 compares the failure probability corresponding to the extracted basic event (such as a failure probability A1 corresponding to an OS failure of AP-server-1 software X1) with failure probabilities which corresponds to the failure mode of the constituent equivalent to that of the basic event (such as a failure probability B1 corresponding to an OS failure of AP-server-1 software X2, a failure probability C1 corresponding to an OS failure of AP-server-1 software X3, or the like) and which is recorded on the failure probability summary data. Here, the AP-server-1 software X1, X2 and X3 have the same function, but respectively of different make (have different performances and the like for achieving the function).

The changeability determining unit 37 determines whether or not there is failure probability smaller than the current failure probability corresponding to the basic event, among the failure probabilities corresponding to the failure mode of the constituent equivalent to that of the basic event included in the failure probability summary data. In a case where there is failure probability smaller than the current failure probability corresponding to the basic event, the changeability determining unit 37 determines that it is possible to increase the availability corresponding to the basic event (to reduce the unavailability corresponding to the basic event), and outputs, to the failure information resetting unit 39, the failure probability corresponding to the failure mode of the constituent equivalent to that of the basic event related to the increase in the availability (reduction in the unavailability).

On the other hand, in a case where there is no failure probability smaller than the current failure probability corresponding to the basic event, the changeability determining unit 37 performs the following processing.

By referring to the mean time to repair summary data sent by way of the information extracting and inputting unit 2, the changeability determining unit 37 compares the mean time to repair which corresponds to the extracted basic event with mean time to repair corresponding to the failure mode of the constituent equivalent to that of the basic event, and which is recorded on the summary data. Subsequently, the changeability determining unit 37 determines whether or not there is mean time to repair shorter than the aforementioned mean time to repair, among the mean time to repair corresponding to the failure mode of the constituent equivalent to the basic event included in the summary data. In a case where there is a shorter mean time to repair, the changeability determining unit 37 determines that it is possible to increase the availability corresponding to the basic event (to reduce the unavailability corresponding to the basic event), and then outputs, to the failure information resetting unit 39, the mean time to repair for the failure mode corresponding to the basic event related to the increase in the availability (reduction in the unavailability).

In contrast, in a case where the failure probability summary data does not include availability of which value is larger than the current availability corresponding to the basic event, and where the mean time to repair summary data does not include mean time to repair shorter than the mean time to repair for the failure mode corresponding to the basic event, the changeability determining unit 37 outputs, to the system configuration resetting unit 38, information indicating that it is not possible to reduce the unavailability corresponding to the extracted basic event.

The failure information resetting unit 39 resets, in the availability calculating unit 34, failure probability to be new failure probability corresponding to the extracted basic event as new analysis information corresponding to the extracted basic event, in a case where it is possible to reduce the unavailability corresponding to the extracted basic event. If it is not possible to reduce the unavailability equivalent to the extracted basic event, the system configuration resetting unit 38 resets, in the information extracting and inputting unit 2, information to be new system configuration information as well as new information concerning a failure corresponding to a failure mode. Incidentally, the failure information resetting unit 39 and the system configuration resetting unit 38 constitute a first resetting unit Concrete explanation thereof is as follows.

If the failure probability corresponding to the failure mode of the constituent equivalent to the basic event is inputted from the changeability determining unit 37, the failure information resetting unit 39 resets the failure probability, in the availability calculating unit 34. In this case, the availability calculating unit 34 retains the failure probabilities corresponding to the respective basic events. When the failure probability corresponding to the basic event is reset by the failure information resetting unit 39, the availability calculating unit 34 calculates the system availability on the basis of the reset failure probability corresponding to the basic event and of the failure probabilities of the basic events other than the aforementioned basic event. Thereafter, the processing after executing the above-described calculation of the system availability again takes place.

If the mean time to repair corresponding to the failure mode of the constituent equivalent to the basic event is inputted from the changeability determining unit 37, the failure information resetting unit 39 resets the mean time to repair, in the availability calculating unit 34. In this case, the availability calculating unit 34 retains the mean time to repair corresponding to each of the basic events. When the mean time to repair corresponding to the basic event is reset by the failure information resetting unit 39, the availability calculating unit 34 calculates the system availability on the basis of the reset mean time to repair corresponding to the basic event and on the mean time to repair for the basic events other than the aforementioned basic event. Thereafter, the processing after executing the above-described calculation of the system availability again takes place.

The system configuration resetting unit 38 resets, in the information extracting and inputting unit 2, a new system configuration inputted by the evaluator of the system, new system functional configuration information 10, new system standard information 12, new reliability-related information 11, and new cost-related information 13. Thereafter, the processing after the processing by the field data analyzing unit 13 is performed as described previously.

When the system availability determining unit 35 determines that the calculated system availability meets the system availability standard value, the cost calculating unit 40 calculates a total sum of the equipment expenses for the constituents which are part of the information system, then calculates an expected operational-loss value on the basis of the system availability calculated by the availability calculating unit 34, the amount of loss due to system shutdown, and the operating period. Thereby, the cost calculating unit 40 adds the total sum to the expected operational-loss value to calculate a cost expense. Concrete explanation thereof is as follows.

The cost calculating unit 40 performs the following processing on the basis of the cost-related information 13 and the system availability standard value which are sent from the information extracting and inputting unit 2. First, the cost calculating unit 40 calculates the total sum of the equipment expenses of the respective constituents, which expenses are included in the cost-related information 13. Next, the cost calculating unit 40 calculates the expected operational-loss value indicating an expected value of the operational loss incurred by shutdown of the information system in a case of operating the information system for a certain period on the basis of the calculated system availability, the amount of loss due to system shutdown, and the operating period. The expected operational-loss value is expressed by the following Formula 4, for example:

Operational loss expected value=(1−calculated system availability)×amount of loss due to system shutdown×operating period [Formula 4]

The cost calculating unit 40 outputs the calculated cost expense to the cost determining unit 41.

The cost determining unit 41 compares the calculated cost expense with the cost tolerance value sent from the information extracting and inputting unit 2. In a case where the cost expense is smaller than the cost tolerance value, the cost determining unit 41 outputs information including the systems availability standard value, the system configuration that satisfies the system tolerance, and the like, to the information outputting unit 5. In this way, the information, such as the system configuration outputted from the information outputting unit 5, is displayed on the user terminal 7. If the cost expense is larger than the cost tolerance value, the cost determining unit 41 outputs information indicating this fact to the cost information resetting unit 42.

The cost information resetting unit 42 is a second resetting unit configured to reset, in the information extracting and inputting unit 2, at least one piece of information among a new cost tolerance value, a new system availability standard value, new system configuration information (for example, new system functional configuration information 10, a new system configuration out of the system standard information 12, and new cost-related information 13) and new information concerning a failure corresponding to a new failure mode (such as new reliability-related information 11) in a case where the calculated cost expense is determined to exceed the cost tolerance value. Concrete explanation thereof is as follows.

The cost information resetting unit 42 causes the information outputting unit 5 to output information for instructing an input of at least one piece of information among the new cost tolerance value, the system availability standard value, and the information concerning the new system, for example. When a user inputs any of the information by use of the user terminal 7, the information is outputted to the cost information resetting unit 42.

If the new cost tolerance value is inputted, the cost information resetting unit 42 resets the cost tolerance value to be a new value, in the information extracting and inputting unit 2. Thereby, the new cost tolerance value is sent to the cost determining unit 41, and the processing by the cost determining unit 41 is executed again on the basis of the new cost tolerance value.

If the new system availability standard value is inputted, the cost information resetting unit 42 resets the new system availability standard value, in the information extracting and inputting unit 2. Thereby, the new system availability standard value is sent to the system availability determining unit 35, and the processing after the processing by the system availability determining unit 35 is executed on the basis of the new system availability standard value.

If the information concerning the new system is inputted, the cost information resetting unit 42 resets this information, in the information extracting and inputting unit 2. Then, the processing after the processing by the field data analyzing unit 31 is executed as described previously.

(Reliability Evaluating Method)

Next, descriptions will be provided below for a reliability evaluating method using the reliability evaluation system which has the above-mentioned configuration. This reliability evaluation is executed while the information system is operated. Incidentally, the same explanation as the explanation in the above-mentioned reliability evaluation system will be omitted in the description of the reliability evaluating method.

First, the person (the evaluator) who conducts reliability evaluation of the information system regularly inputs, by use of the user terminal 7, the times to failure of the failure modes of the hardware constituents and the software constituents and actual values of the time to repair.

The information processing and operating unit 3 stores, in the system management database 6, the times to failure of the failure modes and the actual values of the time to repair as the reliability-related information 11.

Figure 13:
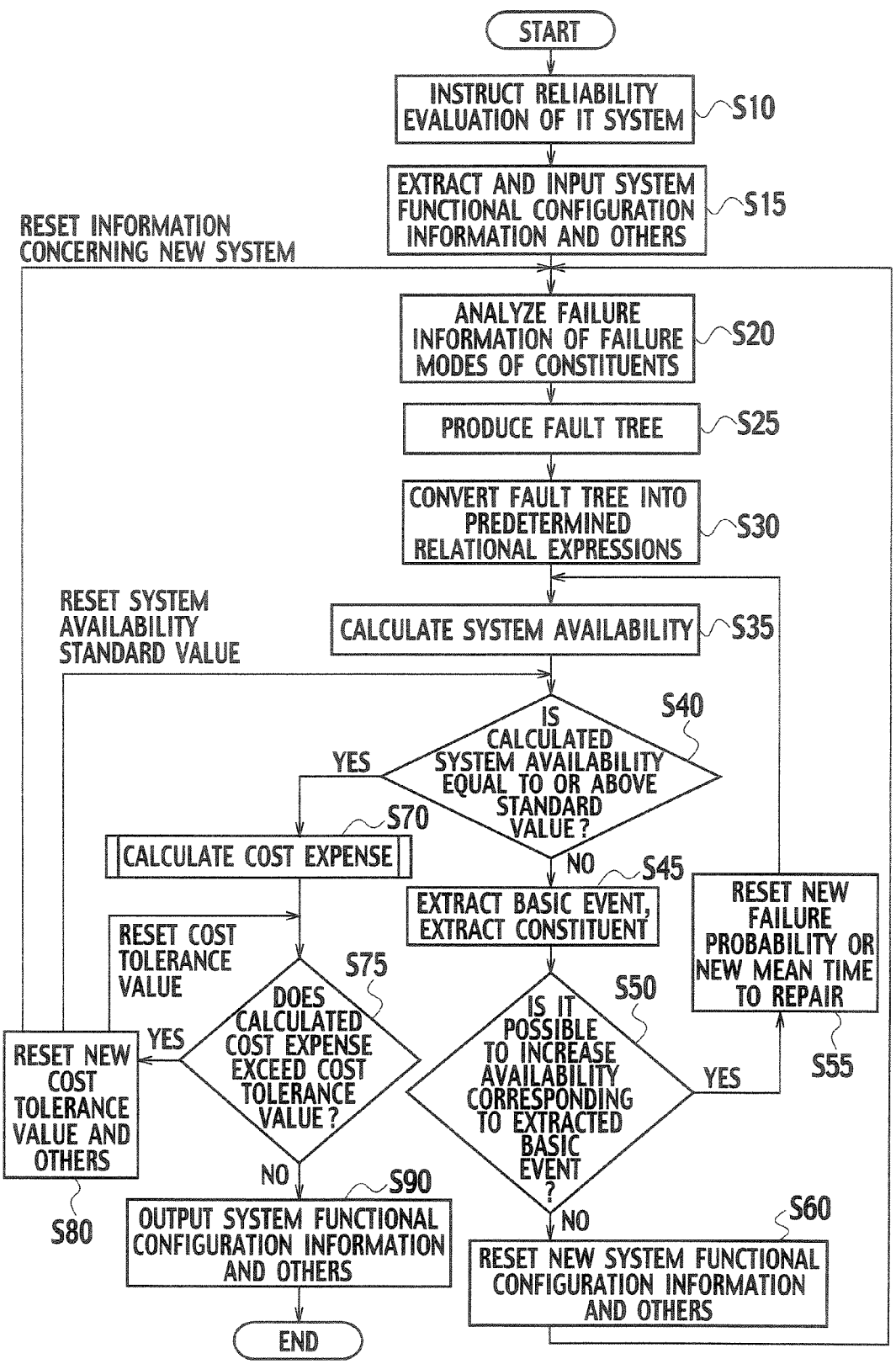
FIG. 13 is a flowchart for explaining a reliability evaluating method of the embodiment of the present invention.

The following reliability evaluation is executed in parallel to the above-described processing. FIG. 13 is flowchart for explaining the reliability evaluating method using the reliability evaluation system which has the above-described configuration.

As shown in FIG. 13, in Step S10, the evaluator inputs an instruction for reliability evaluation on the information system, by use of the user terminal 7. At this time, information for specifying the information system is also inputted.

In Step S15, on the basis of the instruction for reliability evaluation on the information system, the information extracting and inputting unit 2 extracts, from the system management database 6, the system functional configuration information 10, the reliability-related information 11, the cost-related information 13 and the system standard information 12 corresponding to the information for specifying the information system. In this way, the information such as the system functional configuration information 10 is inputted to the information extracting and inputting unit 2.

In Step S20, the field-data analyzing unit 31 calculates the failure probabilities of the failure mode and the mean time to repair as the analysis of information on the failure in the failure modes of the hardware constituents and of the software constituents on the basis of the inputted information, and obtains the failure probabilities and the mean time to repair thus calculated as the analysis information. Here, the field data analyzing unit 31 retains the information inputted from the information extracting and inputting unit 2, and also retains the calculated failure probabilities and the mean time to repair.

In Step S25, the fault-tree producing unit 32 produces the above-described fault tree on the basis of the system functional configuration information 10 and the system configuration contained in the system standard information 12.

In Step S30, the fault-tree/logic converting unit 33 converts the data in the fault tree into the predetermined relational expressions concerning the unavailability q of the top event by use of Formula 2 and Formula 3.

In Step S35, the availability calculating unit 34 calculates the unavailability corresponding to the failure modes of the hardware constituents and of the software constituents on the basis of the analysis information obtained from the field-data analyzing unit 31, that is, the calculated failure probabilities of the respective failure modes and the mean time to repair. Then, the availability calculating unit 34 calculates the system availability corresponding to the top event on the basis of the calculated unavailability corresponding to the basic events and of the predetermined relational expressions concerning the unavailability q of the top event. Here, the availability calculating unit 34 retains the unavailability corresponding to the respective basic events and the system availability thus calculated, and the failure probabilities corresponding to the respective basic events as well as the mean time to repair.

In Step S40, the system availability determining unit 35 determines whether or not the calculated system availability is equal to or above the system availability standard value. When the calculated system availability is determined to be smaller than the system availability standard value, the processing in Step S45 is executed. When the calculated system availability is determined to be equal to or above the system availability standard value, the processing in Step S70 is executed.

In Step S45, the importance determining unit 36 extracts the basic events related to the increase in the system availability, and also extracts the constituent corresponding to this basic event.

In Step S50, the changeability determining unit 37 determines whether or not it is possible to increase the availability corresponding to the basic event (to reduce the unavailability corresponding to the basic event) on the basis of the basic event and the constituent thus extracted. In a case where it is determined to be possible to increase the availability, the processing in Step S55 is executed. In a case where it is determined that the availability cannot be increased, the processing in Step S60 is executed.

In Step S55, failure information resetting unit 39 resets the new failure probabilities or the mean time to repair corresponding to the extracted basic event, in the availability calculating unit 34, as the new analysis information corresponding to the extracted basic event. When the new failure probability corresponding to the extracted basic event is reset to the availability calculating unit 34, the availability calculating unit 34 rewrites the failure probability corresponding to the extracted basic event, among the failure probabilities corresponding to the respective basic events retained therein, with the new failure probability. Then, the availability calculating unit 34 again executes the processing for calculating the system availability in Step S35 on the basis of the new failure probability corresponding to the extracted basic event and of the failure probabilities (the originally retained information) of the basic events other than the extracted basic event. Then, the processing in Step S40 and that thereafter are executed.

When the new mean time to repair for the failure mode corresponding to extracted basic event is reset in the availability calculating unit 34, the availability calculating unit 34 rewrites the mean time to repair corresponding to the extracted basic event among the mean time to repair corresponding to the respective basic events retained therein, with the new mean time to repair. Then, the availability calculating unit 34 again executes the processing for calculating the system availability in Step S35 on the basis of the new mean time to repair corresponding to the extracted basic event and of the mean time to repair (the originally retained information) of the basic events other than the extracted basic event. Then, the processing in Step S40 and that thereafter are executed.

In Step S60, the system configuration resetting unit 38 resets, in the information extracting and inputting unit 2, the new system configuration inputted by the evaluator, the new system functional configuration information, 10, the new system standard information 12, the new reliability-related information 11, and the new cost-related information 13. To be more precise, the system configuration resetting unit 38 causes the user terminal 7 to display the information for instructing the input of information such as the new system configuration. When the evaluator inputs the information such as the new system configuration by use of the user terminal 7, the information is outputted to the system configuration resetting unit 38.

When the information such as the new system configuration is reset to the information extracting and inputting unit 2, the information extracting and inputting unit 2 outputs, to the field data analyzing unit 31, the reset information (the new system configuration, the new system functional configuration information 10, the new system standard information 12, the new reliability-related information 11 and the new cost-related information 13). Then, the processing in Step S20 and that thereafter are again executed.

In Step S70, the cost calculating unit 40 calculates the above-described cost expense. A detailed flowchart of the calculation processing by the cost calculating unit 40 is shown in FIG. 14. As shown in FIG. 14, in Step S71, the cost calculating unit 40 calculates the total sum of the equipment expenses of the respective constituents included in the cost-related information 13. In Step S72, the cost calculating unit 40 calculates the expected operation-loss value. In Step S73, the cost calculating unit 40 adds the total sum of the equipment expenses of the respective constituents to the expected operational-loss value to calculate the cost expense.

In Step S75, the cost determining unit 41 determines whether or not the calculated cost expense exceeds the cost tolerance. The processing in Step S90 is executed when the calculated cost expense does not exceed the cost tolerance, while the processing in Step S80 is executed when the calculated cost expense exceeds the cost tolerance value.

In Step S80, the cost information resetting unit 42 resets, in the information extracting and inputting unit 2, any piece of information out of the new cost tolerance value, the system availability standard value, and the information concerning the new system (the new system configuration as well as the new system functional configuration information 10, the new system standard information 12, the new reliability-related information 11, and the new cost-related information 13) which are inputted by the evaluator.

when the new cost tolerance value is reset in the information extracting and inputting unit 2, the information extracting and inputting unit 2 outputs the new cost tolerance value to the cost determining unit 41. The cost determining unit 41 again executes the determination processing by use of the calculated cost expense and the new cost tolerance value.

When the new system availability standard value is reset in the information extracting and inputting unit 2, the information extracting and inputting unit 2 outputs the new system availability standard value to the system availability determining unit 35. The system availability determining unit 35 again executes the determination processing by use of the calculated system availability and the new system availability standard value. Thereafter, the processing from Step S45 on or the processing from Step S70 on is executed.

When the information concerning the new system is inputted, this information is reset in the information extracting and inputting unit 2. Then, as described previously, the processing in Step S20 and that thereafter are executed on the basis of the reset information.

In Step S90, the information outputting unit 5 outputs the information such as the system functional configuration information 10, and the system standard information 12, to the user terminal 7. Thereby, the information including the system functional configuration information 10 and the system standard information 12 (the information concerning the configuration of the information system that satisfies the system availability standard value and the cost tolerance value) is displayed on the user terminal 7.

(Operations and Effects)

According to this embodiment, the constituents targeted for reliability evaluation on the information system include not only the hardware but also the software. Thus, the information necessary for reliability evaluation (such as the system functional configuration information 10) is the information that considers not only the hardware but also the software. Moreover the processing from that by the field-data analyzing unit 31 to that by the system availability determining unit 35 is executed on the basis of the information inputted to the information extracting and inputting unit 2. When the system availability determining system 35 determines that the calculated system availability does not meet the system availability standard value, the processing by the system configuration resetting unit 38 or the processing by the failure information resetting unit 39 is executed after the processing from that by the importance analyzing unit 36 to that by the changeability determining unit 37. Then, the processing is executed by the system availability determining unit 35 on the basis of the reset information. It is possible to repeat the above-described processing until the calculated system availability meets the system availability standard value.

Moreover, unlike the conventional technique, evaluation of the system availability is executed in consideration of not only the hardware failure events but also the software failure events. Accordingly, it is possible to avoid a situation where the system availability falls below the system availability standard value at the time when the system configuration is changed and operated in accordance with the system functional configuration information 10 and the system standard information 12 corresponding to the evaluated system availability. As a result, it is possible to avoid increase in the number of times when the information system is redesigned, and thereby to reduce a burden on a designer who designs the information system. Thus, according to this embodiment, it is possible to improve the system availability, and to reduce the burden on the designer who designs the information system.

Moreover, the person who evaluates the system reliability can learn a relationship between program contents and the failure in the information system as long as he can understand the program contents constituting the software related to an operation of the information system. By use of the above relationship, it would be possible to evaluate the system availability. However, in most actual cases, the evaluator cannot understand the program contents of the software. For this reason, evaluation of the system availability has not considered the software. When the system availability is evaluated in consideration of the failure events of the software, the person who evaluates the system reliability needs to understand the program contents of the software. As a consequence, the burden on the person who executes the reliability evaluation has been increased.

In this embodiment, it is possible to evaluate the system availability in consideration of not only the failure events of the hardware but also the failure events of the software without the user understanding the program contents constituting the software. Accordingly, it is possible to reduce the burden on the person who executes evaluation of the system reliability.

Moreover, according to this embodiment, the field-data analyzing unit 31 classifies the information (the failure information) concerning the failures corresponding to the failure mode, out of the information inputted by the information extracting and inputting unit 2, and performs the aforementioned analysis on the basis of the result of classification. Thus, it is not necessary to execute processing concerning information not related to the analysis processing at the time when the analysis processing is executed for each failure mode. It is therefore possible to execute the analysis processing promptly.

In addition, according to this embodiment, the field-data analyzing unit 31 calculates the failure probabilities of the failure modes by use of the Weibull distribution. Thus, the processing of calculating the failure probabilities of the failure modes is carried out promptly. As a result, it is possible to calculate the unavailability of the constituents promptly as well. Moreover, since it is possible to calculate the failure probabilities of the failure modes without distinguishing between the software and the hardware. Accordingly, it is possible to reduce a load on the field data analyzing unit 31 as compared to a case where the failure probabilities of the failure mode are calculated while distinguishing between the software and the hardware.

In addition, according to this embodiment, when the system availability determining unit 35 determines that the calculated system availability meets the system availability standard value, the cost calculating unit 40 calculates the expected operational-loss value and the total sum of the equipment expenses of the constituents which are part of the information system. Then, the cost calculating unit 40 adds the expected operational-loss value to the total sum of the equipment expenses of the constituents included in the information system to calculate the cost expense. The cost determining unit 41 determines whether or not the calculated cost expense exceeds the cost tolerance value. When the calculated cost expense is determined to exceed the cost tolerance, the cost information resetting unit 42 resets, in the information extracting and inputting unit 2, any of the information out of the new cost tolerance, the availability standard value of the new system, the new system configuration information, and the new information concerning the failures corresponding to the failure modes. Then, on the basis of the reset information, the processing by the system availability determining unit 35 and the processing by the cost determining unit 41 are executed. It is possible to repeat the above-described processing until the calculated system availability meets the system availability standard value, and until the calculated cost expense is suppressed within the cost tolerance value. For this reason, it is possible to improve the system availability, and to provide the system capable of suppressing costs necessary for achieving and operating the system. In this embodiment, it is possible to provide the information system designed to suppress the costs necessary for achieving and operating the information system while suppressing the costs in consideration of the operational loss as well.

MODIFIED EXAMPLES (1) Note that the field-data analyzing unit 31 may calculate the failure probabilities of the failure modes as follows. For each failure mode, the system management database 6 stores the times to failure (t1, t2 and so forth) of the failure mode and actual value data (which may also be data calculated by simulation or the like) of the failure probabilities (f(t1), f(t2) and so on) associated with the times to failure. The field-data analyzing unit 31 may be configured to estimate failure probability distribution of the failure modes on the basis of the actual value data of the failure probabilities (f(t1), f(t2) and so on) associated with the times to failure, and then to calculate the failure probability (F(t)) of the failure mode.

According to this modified example, the field-data analyzing unit 31 calculates the failure probabilities of the failure mode by use of the data (such as the actual measurement data) indicating the relationship between the times to failure and the failure probabilities of the failure mode. Thus, each failure probability of the failure mode is calculated more accurately. As a result, it is possible to calculate the failure probability more accurately than the unavailability of the constituents.

(2) The above-described reliability evaluation system for an information system is activated in the course of operating the information system. However, the invention is not limited to the foregoing, and the system may be activated at a design stage of the information system. In this case, out of the system standard information 12, the system configuration is equivalent to a system construction plan, and the system availability standard value is equivalent to a design standard value of the system availability. Moreover, the reliability-related information 11 is not an actual value obtained in the course of operating the information system, but is a predetermined specification value or a predicted value obtained through simulation and the like.

(3) Although the information extracting and inputting unit 2 is configured to extract the information necessary for the reliability evaluation, from the system management database 6, the invention is not limited to the foregoing. It is also possible to input, by use of the user terminal 7, the information necessary for the reliability information, to the information extracting and inputting unit 2. Moreover, the failure information included in the classification tables shown in FIG. 4 and FIG. 5 may include information concerning maintenance of the failure modes. Then, the above-described mean time to repair may be calculated on the basis of this information concerning the maintenance.

(4) In the above-described embodiment, the changeability determining unit 37 may execute the following processing. The changeability determining unit 37 causes the user terminal 7 to display information for inquiring whether there is a constituent having a lower failure probability than the current failure probability corresponding to the constituent of the extracted basic event.

When there is a constituent having the lower failure probability than the current failure probability, the constituent and the failure probability is inputted accordingly to the user terminal 7. When there is not a constituent having the lower failure probability than the current failure probability, this fact is inputted to the user terminal 7. The changeability determining unit 37 may determine whether or not there is a constituent having the lower failure probability than the current failure probability corresponding to the constituent equivalent to that of the extracted basic event on the basis of the information inputted to the user terminal 7.

Likewise, the changeability determining unit 37 may cause the user terminal 7 to display information for inquiring whether or not there is a constituent having shorter mean time to repair than the current mean time to repair corresponding to the failure mode of the constituent equivalent to that of the extracted basic event. As similar to the above description the changeability determining unit 37 may determine whether or not there is a constituent having shorter mean time to repair than the current mean time to repair corresponding to the failure mode of the constituent equivalent to that of the extracted basic event on the basis of information inputted to the user terminal 7.

(5) In the aforementioned embodiment, the above-described reliability evaluation is executed by use of various pieces of information concerning the hardware constituents and the software constituents (the system functional configuration information 10, the information concerning the failure modes of the constituents, and the cost-related information 13). However, the invention is not limited to the foregoing. It is also possible to execute the above-described reliability evaluation by use of various pieces of information concerning a constituent group including the hardware constituents and a constituent group including the software constituents. For example, in a case where the hardware constituents are a CPU, a memory and a hard disk of the AP server 1, the constituent group including the hardware constituents is equivalent to the AP server 1 or the AP server group. For example, in a case where the software constituents include the AP-server-1 software 1, the AP-server-1 software 2, and so on that constitute the AP-server-1 software, the constituent group including the software constituents is equivalent to the AP-server-1 software. It is also possible to execute the above-described reliability evaluation on the basis of various pieces of information concerning the constituents (the system functional configuration information 10, the information concerning the failure modes of the constituents, the cost-related information 13, and the like) and of various pieces of information concerning the constituent groups (the system functional configuration information 10, the information concerning the failure modes of the constituent groups, the cost-related information 13, and the like).

Thereby, it is possible to execute the above-described reliability evaluation without the data concerning the failures on each constituent as long as there are data concerning the failures on each constituent group. Accordingly, it is possible to avoid a situation where it is not possible to execute the reliability evaluation in a case where there is no detailed information concerning the failures for the reliability evaluation.

(6) In the above-described embodiment, the cost determining unit 40 adds the total sum of the equipment expenses of the respective constituents to the expected operational-loss value. However, the present invention is not limited to the foregoing. It is also possible to calculate only the total sum of the equipment expenses of the respective constituents as the cost expense. Moreover, the cost information resetting unit 42 may reset, in the information extracting and inputting unit 2, at least one piece of information among the new cost tolerance range and the information concerning the new system (the new system configuration as well as the new system functional configuration information 10, the new system standard information 12, and the new cost-related information 13).

(Reliability Evaluation Program)

Note that a computer can execute the processing in the reliability evaluation system for an information system of the embodiment and of the modified examples by executing a program (a reliability evaluation program for an information system) for causing the information extracting and inputting units 2, the information processing and operating unit 3 and the information outputting unit 5 of the embodiment and of the modified examples. According to this program, it is possible to easily achieve the reliability evaluation systems that exert the operations and effects shown in the embodiment and in the modified examples by use of a general-purpose computer.

Moreover, the program may be recorded on a computer-readable recording medium. As shown in FIG. 15, this recording medium includes a hard disk 1100, a flexible disk 1200, a compact disc 1300, an IC chip 1400, and a cassette tape 1500. Storing, transporting, selling, and the like of the program is made easy by use of the recording medium which records this program.

Lastly, according to the present invention, the constituents targeted for the reliability evaluation of an information system includes not only the hardware constituents but also the software constituents. Thus, the inputted information required for the reliability evaluation (such as the system functional configuration information 10) is information in which not only the hardware but also the software are considered. Moreover, the processing from the information analysis to the availability determination is executed on the basis of the inputted information. Furthermore, the first resetting processing is executed when the calculated system availability is determined to not meet the standard value of the system availability, and the processing for the availability determination is executed on the basis of the reset information. It is possible to repeat the above-described processing until the calculated system availability meets the standard value of the system availability.

Moreover, unlike the conventional technique, the system availability is evaluated in consideration of not only the hardware failure events but also the software failure events. Accordingly, when modifying and operating the configuration of the information system in accordance with the system configuration information (such as the system functional configuration information 10) corresponding to the evaluated system availability, it is possible to avoid a situation where the system availability falls below the standard value of the system availability. As a result, it is possible to avoid an increase in the frequency of redesigning the information system, and thereby to reduce a burden on a designer who designs the information system. Thus, according to the present invention, it is possible to improve the system availability, and to reduce the burden on the designer who designs the information system.

INDUSTRIAL APPLICABILITY

An embodiment and modified examples of the present invention have been described above. However, concrete examples are merely disclosed herein, and they will not limit the present invention in particular. It is possible to modify concrete configurations of the respective constituents as appropriate. Moreover, the operations and effect disclosed in conjunction with the embodiment and the modified examples are merely the listing of the most preferable operations and effects achieved by the present invention. Hence, the operations and effects of the present invention will not be limited to those described in the embodiment and the modified examples of the present invention. For example, the present invention is applicable to various information systems including online transaction systems, various service systems, nuclear power plant systems and other plant systems.

What is claimed is:

1. A reliability evaluation system for an information system, comprising:
   an information inputting unit configured to input information necessary for reliability evaluation of the information system provided with an instrument, containing at least information concerning constituents indicating both software for executing a function of the instrument and hardware constituting the instrument, or concerning failures corresponding to failure modes of a constituent group formed of the constituents, system configuration information indicating information concerning a configuration of the information system employing the instrument and any of the constituents and the constituent group, and a standard value of system availability indicating availability of the entire information system;
   an information analyzing unit having a processor programmed to analyze information on the failures of each of the failure modes of any of the constituents and the constituent group, and thereby obtaining analysis information thereon;
   a fault-tree producing unit configured to produce a fault tree indicating hierarchical logical relationships from a top event indicating a failure mode of the information system to basic events indicating the failure modes of any of the constituents and the constituent group on the basis of the system configuration information;
   an unavailability calculating unit configured to calculate unavailability of any of the constituents and the constituent group corresponding to the failure modes of any of the constituents and the constituent group on the basis of the analysis information
   a system availability calculating unit configured to calculate, on the basis of the fault tree and the unavailability corresponding to the basic events, availability corresponding to the top event as system availability in a case where it is supposed that the calculated unavailability is unavailability corresponding to the basic events equivalent to the failure modes of any of the constituents and the constituent group;
   an availability determining unit configured to determine whether or not the calculated system availability meets the standard value of the system availability;
   a basic-event extracting unit configured to extract the basic event related to an increase in the system availability by use of a relationship between variation in the unavailability corresponding to the basic events and variation in the unavailability corresponding to the top event, in a case where it is determined that the calculated system availability does not meet the standard value; and
   a first resetting unit configured to reset new analysis information corresponding to the extracted basic event in a case where it is possible to reduce the unavailability corresponding to the extracted basic event, and to reset new system configuration information and information concerning a failure corresponding to a new failure mode in a case where it is not possible to reduce the unavailability corresponding to the extracted basic event.

2. The reliability evaluation system for an information system according to claim 1, wherein the information analyzing unit classifies the information concerning the failures corresponding to the failure modes, out of the information inputted by the information inputting unit, by failure mode and by instrument group, and thereby executes the analysis on the basis of a result of classification, the instrument group indicating a set of instruments which are included in the information system, and which are classified by processing function.

3. The reliability evaluation system for an information system according to any one of claims 1 and 2, wherein
   the information concerning the failures, which is inputted to the information inputting unit, includes times to failure of the failure modes of any of the constituents and the constituent group, and
   the information analyzing unit calculates failure probabilities of the failure modes of any of the constituents and the constituent group on the basis of the times to failure of the failure modes of any of the constituents and the constituent group, and on the basis of Weibull distribution indicating distribution of the failure probabilities changed according to the times to failure, and thereby obtains the calculated failure probabilities as the analysis information.

4. The reliability evaluation system for an information system according to claim 1, wherein
   the information concerning the failures, which is inputted to the information inputting unit, includes times to failure of the failure modes of any of the constituents and the constituent group and failure probabilities corresponding to the times to failure, and the information analyzing unit calculates distribution of the failure probabilities changed according to the times to failure as the analysis on the basis of the times to failure of the failure modes of any of the constituents and the constituent group and on the basis of the failure probabilities corresponding to the times to failure, then calculates failure probabilities of the failure modes of any of the constituents and the constituent group on the basis of the distribution, and thereby obtains the calculated failure probabilities as the analysis information.

5. The reliability evaluation system for an information system according to any one of claims 1 and 2, wherein the information concerning the failures, which is inputted to the information inputting unit, includes time to repair for the failure modes of any of the constituents and the constituent group, and the information analyzing unit calculates a mean time to repair for the failure modes of any of the constituents and the constituent group on the basis of the time to repair for the failure modes of any of the constituents and the constituent group, which is inputted to the information inputting unit, and thereby obtains the calculated mean time to repair as the analysis information.

6. The reliability evaluation system for an information system according to claim 1, wherein equipment expenses indicating costs necessary for any of the constituents and the constituent group and a cost tolerance value indicating an allowable range of the costs necessary for the information system are inputted to the information inputting unit, and the reliability evaluation system further comprising:

a cost calculating unit configured to calculate a total sum of the equipment expenses for any of the constituents and the constituent group included in the information system as a cost expense in a case where the availability determining unit determines that the calculated system availability meets the standard value;

a cost determining unit configured to determine whether or not the calculated cost expense exceeds the cost tolerance value; and a second resetting unit configured to reset, in the information inputting unit, at least one piece of information among a new cost tolerance value, new system configuration information, and new information concerning a failure corresponding to a new failure mode in a case where the calculated cost expense is determined as exceeding the cost tolerance value.

7. The reliability evaluation system for an information system according to claim 6, wherein an operational loss indicating an operational loss incurred by shutdown of the information system for a unit period and an operating period of the information system are inputted to the information inputting unit, the cost calculating unit calculates an expected operational-loss value on the basis of the calculated system availability, the operational loss and the operating period, and adds the expected calculated operational-loss value to the total sum of the equipment expenses to calculate the cost expense, and the second resetting unit resets, in the information inputting unit, at least one piece of information among the new cost tolerance value, a new system availability standard value, the new system configuration information and the new information concerning the failure corresponding to the new failure mode in a case where the calculated cost expense is determined as exceeding the cost tolerance value.

8. A reliability evaluating method for an information system, comprising:

executing information input to input information, as information necessary for reliability evaluation of the information system provided with an instrument, which information contains at least information concerning constituents indicating both software for executing a function of an instrument and hardware constituting the instrument or concerning failures corresponding to failure modes of a constituent group formed of the constituents, system configuration information indicating information concerning a configuration of the information system employing the instrument and any of the constituents and the constituent group, and a standard value of system availability indicating availability of the entire information system;

analyzing information on the failures of each of the failure modes of any of the constituents and the constituent group, and thereby obtaining analysis information thereon;

executing fault-tree production to produce a fault tree indicating hierarchical logical relations from a top event indicating a failure mode of the information system to basic events indicating the failure modes of any of the constituents and the constituent group on the basis of the system configuration information;

executing unavailability calculation to calculate unavailability of any of the constituents and the constituent group corresponding to the failure modes of any of the constituents and the constituent group on the basis of the analysis information;

executing system availability calculation to calculate, on the basis of the unavailability corresponding to the basic events and of the fault tree, availability corresponding to the top event as system availability in a case where it is supposed that the calculated unavailability is unavailability corresponding to the basic events equivalent to the failure modes of any of the constituents and the constituent group;

executing availability determination to determine whether or not the calculated system availability meets the standard value of the system availability;

executing basic event extraction to extract the basic event related to an increase in the system availability by use of a relationship between variation in the unavailability corresponding to the basic events and variation in the unavailability corresponding to the top event, in a case where it is determined that the calculated system availability does not meet the standard value;

executing first resetting to reset new analysis information corresponding to the extracted basic event in a case where it is possible to reduce the unavailability corresponding to the extracted basic event, and to reset new system configuration information and information concerning a failure corresponding to a new failure mode in a case where it is not possible to reduce the unavailability corresponding to the extracted basic event; and executing the unavailability calculating process and the processes thereafter in a case where the new analysis information corresponding to the extracted basic event is reset, and executing the information analyzing process and the processes thereafter in a case where the information concerning a new failure of the failure mode corresponding to the extracted basic event is reset, and where the new system configuration information and the information concerning the failure corresponding to the new failure mode are reset.

9. The reliability evaluating method for an information system according to claim 8, wherein, in the information analysis, the information concerning the failures corresponding to the failure modes, out of the information inputted by the information inputting unit, is classified by failure mode and by instrument group, and thereby the analysis is executed on the basis of a result of classification, the instrument group indicating a set of instruments which are included in the information system, and which are classified by processing function.

10. The reliability evaluating method for an information system according to any one of claims 8 and 9, wherein
the information concerning the failures, which is inputted by the information input, comprises times to failure of the failure modes of any of the constituents and the constituent group, and
in the information analysis, failure probabilities of the failure modes of any of the constituents and the constituent group are calculated as the analysis on the basis of the times to failure of the failure modes of any of the constituents and the constituent group and on the basis of Weibull distribution indicating distribution of the failure probabilities changed according to the times to failure, and the calculated failure probabilities are obtained as the analysis information.

11. The reliability evaluating method for an information system according to claim 8, wherein
the information concerning the failures, which is inputted by the information input, comprises times to failure in the failure modes of any of the constituents and the constituent group and failure probabilities corresponding to the times to failure, and
in the information analysis, distribution of the failure probabilities changed according to the times to failure is calculated as the analysis on the basis of the times to failure of the failure modes of any of the constituents and the constituent group and on the basis of the failure probabilities corresponding to the times to failure, and failure probabilities of the failure modes of any of the constituents and the constituent group are calculated on the basis of the distribution, and thereby the calculated failure probabilities are obtained as the analysis information.

12. The reliability evaluating method for an information system according to any one of claims 8 and 9, wherein
the information concerning the failures, which is inputted by the information input. includes times to repair for the failure modes of any of the constituents and the constituent group, and
in the information analysis, a mean time to repair for the failure modes of any of the constituents and the constituent group is calculated as the analysis on the basis of the time to repair for the failure modes of any of the constituents and the constituent group inputted to the information inputting unit, and thereby the calculated mean time to repair is obtained as the analysis information.

13. The reliability evaluating method for an information system according to claim 8, wherein,
at the time of the information input, equipment expenses indicating costs necessary for any of the constituents and the constituent group and a cost tolerance value indicating an allowable range of the costs necessary for the information system are inputted, and
the reliability evaluating method further comprising:
executing cost calculation to calculate a total sum of the equipment expenses for any of the constituents and the constituent group included in the information system as a cost expense in a case where the calculated system availability is determined as meeting the standard value,
executing cost determination to determine whether or not the calculated cost expense exceeds the cost tolerance value,
executing second resetting to reset at least one piece of information among a new cost tolerance value, new system configuration information, and new information concerning a failure corresponding to a new failure mode is executed in a case where the calculated cost expense is determined as exceeding the cost tolerance value, and
executing the cost calculation process and the processes thereafter in a case where the new cost tolerance value is reset, and executing the information analyzing process and the processes thereafter in a case where the new system configuration information and the information concerning the failure corresponding to the new failure mode are reset.

14. The reliability evaluating method for an information system according to claim 13, wherein,
at the time of the information input, an operational loss indicating an operational loss incurred by shutdown of the information system for a unit period and an operating period of the information system are inputted,
in the cost calculation, an expected operational-loss value is calculated on the basis of the calculated system availability, the operational loss, and the operating period, a sum of the calculated expected operational-loss value and the total sum of the equipment expanses is calculated as the cost expense,
in the second resetting, at least one piece of information among the new cost tolerance value, a new system availability standard value, the new system configuration information. and the new information concerning the failure corresponding to the new failure mode is reset in a case where the calculated cost expense is determined as exceeding the cost tolerance value, and
the availability determining process and the processes thereafter are executed in a case where the new system availability standard value is reset.

15. A computer readable storage medium encoded with a reliability evaluation program for an information system,
the reliability evaluation program, when executed by a computer, causing the computer to:
execute information input of input information necessary for reliability evaluation of the information system provided with an instrument, containing at least information concerning constituents indicating both software for executing a function of the instrument and hardware constituting the instrument, or concerning failures corresponding to failure modes of a constituent group formed of the constituents, system configuration information indicating information concerning a configuration of the information system employing the instrument and any of the constituents and the constituent group, and a standard value of system availability indicating availability of the entire information system;
analyze information on the failures of each of the failure modes of any of the constituents and the constituent group, and thereby obtaining analysis information thereon;
execute fault-tree production to produce a fault tree indicating hierarchical logical relationships from a top event indicating a failure mode of the information system to basic events indicating the failure modes of any of the constituents and the constituent group on the basis of the system configuration information;

execute unavailability calculation to calculate unavailability of any of the constituents and the constituent group corresponding to the failure modes of any of the constituents and the constituent group on the basis of the analysis information;

execute system availability calculation to calculate, on the basis of the fault tree and the unavailability corresponding to the basic events, availability corresponding to the top event as system availability in a case where it is supposed that the calculated unavailability is unavailability corresponding to the basic events equivalent to the failure modes of any of the constituents and the constituent group;

execute availability determination to determine whether or not the calculated system availability meets the standard value of the system availability;

execute basic event extraction to extract the basic event related to an increase in the system availability by use of a relationship between variation in the unavailability corresponding to the basic events and variation in the unavailability corresponding to the top event, in a case where it is determined that the calculated system availability does not meet the standard value;

execute first resetting to reset new analysis information corresponding to the extracted basic event in a case where it is possible to reduce the unavailability corresponding to the extracted basic event, and to reset new system configuration information and information concerning a failure corresponding to a new failure mode in a case where it is not possible to reduce the unavailability corresponding to the extracted basic event; and execute the unavailability calculating process and the processes thereafter in a case where the new analysis information corresponding to the extracted basic event is reset, and executing the information analyzing process and the processes thereafter in a case where the information concerning a new failure in the failure mode corresponding to the extracted basic event is reset, and where the new system configuration information and the information concerning the failure corresponding to the new failure mode are reset.

16. A reliability evaluation system for an information system, comprising:

an information inputting unit to input information necessary for reliability evaluation of the information system provided with an instrument, containing at least information concerning constituents indicating both software for executing a function of the instrument and hardware constituting the instrument, or concerning failures corresponding to failure modes of a constituent group formed of the constituents, system configuration information indicating information concerning a configuration of the information system employing the instrument and any of the constituents and the constituent group, and a standard value of system availability indicating availability of the entire information system;

a memory to store the input information;

an information analyzing unit to analyze information stored in the memory on the failures of each of the failure modes of any of the constituents and the constituent group, thereby obtaining analysis information thereon, and storing the analysis information in the memory;

a fault-tree producing unit to produce a fault tree indicating hierarchical logical relationships from a top event indicating a failure mode of the information system to basic events indicating the failure modes of any of the constituents and the constituent group on the basis of the system configuration information stored in the memory;

an unavailability calculating unit to calculate unavailability of any of the constituents and the constituent group corresponding to the failure modes of any of the constituents and the constituent group on the basis of the analysis information stored in the memory;

a system availability calculating unit to calculate, on the basis of the fault tree and the unavailability corresponding to the basic events, availability corresponding to the top event as system availability in a case where it is supposed that the calculated unavailability is unavailability corresponding to the basic events equivalent to the failure modes of any of the constituents and the constituent group;

an availability determining unit to determine whether or not the calculated system availability meets the standard value of the system availability;

a basic-event extracting unit to extract the basic event related to an increase in the system availability by use of a relationship between variation in the unavailability corresponding to the basic events and variation in the unavailability corresponding to the top event, in a case where it is determined that the calculated system availability does not meet the standard value; and a first resetting unit to reset new analysis information corresponding to the extracted basic event in a case where it is possible to reduce the unavailability corresponding to the extracted basic event, and to reset new system configuration information and information concerning a failure corresponding to a new failure mode in a case where it is not possible to reduce the unavailability corresponding to the extracted basic event.

17. A reliability evaluation system for an information system, comprising a processor programmed to:

input information necessary for reliability evaluation of the information system provided with an instrument, containing at least information concerning constituents indicating both software for executing a function of the instrument and hardware constituting the instrument, or concerning failures corresponding to failure modes of a constituent group formed of the constituents, system configuration information indicating information concerning a configuration of the information system employing the instrument and any of the constituents and the constituent group, and a standard value of system availability indicating availability of the entire information system;

analyze information on the failures of each of the failure modes of any of the constituents and the constituent group, and thereby obtaining analysis information thereon;

produce a fault tree indicating hierarchical logical relationships from a top event indicating a failure mode of the information system to basic events indicating the failure modes of any of the constituents and the constituent group on the basis of the system configuration information;

calculate unavailability of any of the constituents and the constituent group corresponding to the failure modes of any of the constituents and the constituent group on the basis of the analysis information;

calculate, on the basis of the fault tree and the unavailability corresponding to the basic events, availability corresponding to the top event as system availability in a case where it is supposed that the calculated unavailability is unavailability corresponding to the basic events equivalent to the failure modes of any of the constituents and the constituent group;

determine whether or not the calculated system availability meets the standard value of the system availability;

extract the basic event related to an increase in the system availability by use of a relationship between variation in the unavailability corresponding to the basic events and variation in the unavailability corresponding to the top event, in a case where it is determined that the calculated system availability does not meet the standard value;

reset new analysis information corresponding to the extracted basic event in a case where it is possible to reduce the unavailability corresponding to the extracted basic event; and reset new system configuration information and information concerning a failure corresponding to a new failure mode in a case where it is not possible to reduce the unavailability corresponding to the extracted basic event.

\* \* \* \* \*